US012404800B1

(12) United States Patent
Gilbertson et al.

(10) Patent No.: US 12,404,800 B1
(45) Date of Patent: Sep. 2, 2025

(54) MOTORCYCLE-ENGINE SUPERCHARGER

(71) Applicant: Gilby's Street Dept, River Falls, WI (US)

(72) Inventors: Todd D. Gilbertson, River Falls, WI (US); Gabriel T. Hilgers, River Falls, WI (US); John D. Trutnau, River Falls, WI (US)

(73) Assignee: GILBY'S STREET DEPT, River Falls, WI (US)

( * ) Notice: Subject to any disclaimer, the term of this patent is extended or adjusted under 35 U.S.C. 154(b) by 0 days.

(21) Appl. No.: 18/744,519

(22) Filed: Jun. 14, 2024

(51) Int. Cl.
*F02B 33/40* (2006.01)
*F02B 67/06* (2006.01)
*F02B 67/10* (2006.01)

(52) U.S. Cl.
CPC .............. *F02B 33/40* (2013.01); *F02B 67/06* (2013.01); *F02B 67/10* (2013.01)

(58) Field of Classification Search
CPC ........... F02B 33/32–33/40; F02B 67/06; F02B 67/10; F02B 39/02; F16H 55/36–55/566
See application file for complete search history.

(56) References Cited

U.S. PATENT DOCUMENTS 2,402,743 A * 6/1946 Firth ........................ F16D 1/096 474/902
4,144,755 A * 3/1979 Palloch ................... F16H 55/36 474/903
6,022,285 A * 2/2000 Firdaus ..................... F16H 7/24 474/86
2002/0151398 A1* 10/2002 Campbell ............... F16H 55/36 474/166
2007/0193563 A1* 8/2007 Beattie .................... F02B 39/12 192/46
2011/0303198 A1* 12/2011 Thomson ................ F02B 39/14 74/417
2017/0002729 A1* 1/2017 Burtt ..................... F04D 25/163

OTHER PUBLICATIONS

Grainger Catalog 412 (cited pages) (Year: 2021).*

* cited by examiner

*Primary Examiner* — Loren C Edwards
(74) *Attorney, Agent, or Firm* — PITT I.P.; Jacob E. Pittman

(57) ABSTRACT

A driveshaft assembly for a motorcycle supercharger includes: an elongated driveshaft defining a tapered distal portion, and a flywheel drive pulley defining a tapered central bore. The tapered central bore of the drive pulley is configured to receive the tapered distal portion of the driveshaft to form a locking-taper interface between the driveshaft and the flywheel drive pulley, thereby substantially increasing the durability and longevity of the supercharger. The enhanced driveshaft assembly may be retrofitted onto an existing supercharger system, or may be part of a new or custom supercharger installation.

8 Claims, 24 Drawing Sheets

MOTORCYCLE-ENGINE SUPERCHARGER

TECHNICAL FIELD

The present technology is generally related to combustion engines, and in particular, superchargers for combustion engines of motorcycles.

BACKGROUND

"Superchargers" and "turbochargers" are devices configured to increase the power output of an internal combustion engine by increasing the engine's air intake. For instance, such devices can include air compressors and/or blowers configured to increase the rate, density, and/or pressure of air flowing into the engine. With a supercharger, the fluid propulsion is typically powered directly by a driveshaft coupled to the engine. By contrast, a turbocharger is typically driven by the flow of exhaust as it exits the engine.

SUMMARY OF THE DISCLOSURE

The techniques of this disclosure generally relate to systems, devices, and kits configured to supercharge an engine, particularly that of a motorcycle. The components described herein are uniquely tailored and crafted so as to substantially improve their durability and longevity when compared with their presently-available counterparts.

Some examples of the present disclosure include a motorcycle-supercharger enhancement kit with: a driveshaft assembly defining a central longitudinal axis, the driveshaft assembly comprising: a driveshaft defining a tapered distal portion, and a flywheel drive pulley defining a tapered central bore configured to receive the tapered distal portion of the driveshaft to form a locking-taper interface between the driveshaft and the flywheel drive pulley.

The details of one or more aspects of the disclosure are set forth in the accompanying drawings and the description below. Other features, objects, and advantages of the techniques described in this disclosure will be apparent from the description and the drawings, and from the claims.

BRIEF DESCRIPTION OF THE DRAWINGS

The disclosure can be more completely understood in consideration of the following detailed description of various embodiments of the disclosure, in connection with the accompanying drawings, in which.

Figure 1:
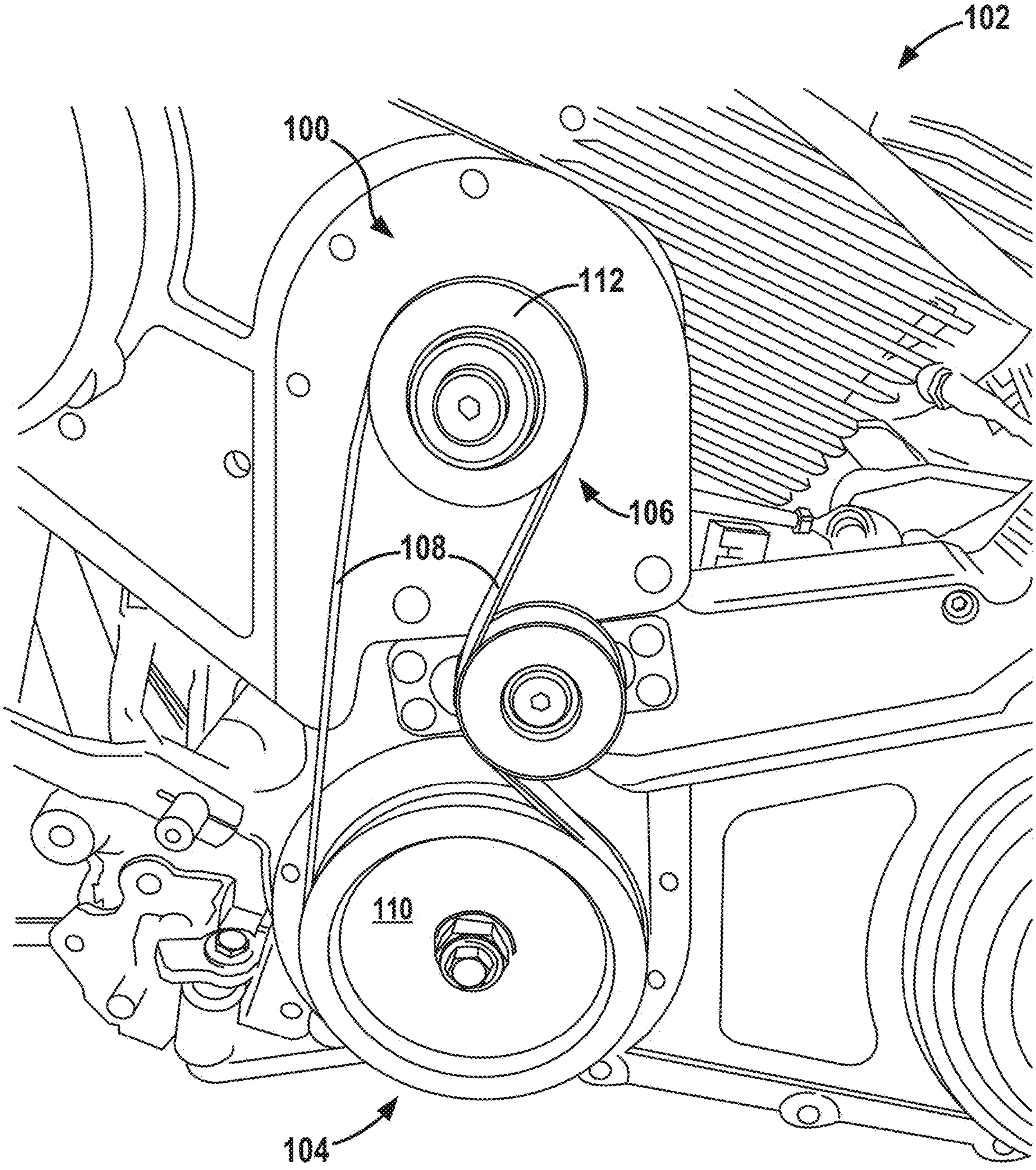
FIG. 1 is a profile view of an example engine-supercharger system for a motorcycle, in accordance with techniques of the present disclosure.

While examples of this disclosure are amenable to various modifications and alternative forms, specifics thereof shown by way of example in the drawings will be described in detail. It should be understood, however, that the intention is not to limit the disclosure to the particular examples described.

DETAILED DESCRIPTION

The present disclosure describes various examples of devices, systems, and techniques for supercharge a motorcycle engine. The components described herein are uniquely tailored and crafted so as to substantially improve their durability and longevity when compared with their presently-available counterparts. For instance, FIG. 1 is a profile view of an example engine-supercharger system 100 for a motorcycle 102, in accordance with techniques of the present disclosure.

Supercharger system 100 includes: a driveshaft assembly 104; an intermediate-shaft assembly 106; and a drive belt

108 configured to transfer rotational motion from the driveshaft assembly 104 to the intermediate-shaft assembly 106.

Driveshaft assembly 104 (or "compensator bolt assembly 104") includes a driveshaft (not shown in FIG. 1) and a flywheel drive-pulley wheel 110 (or simply "drive pulley 110").

The driveshaft (not shown) is rotatably coupled to the engine of the motorcycle 102 such that, while the engine is running, the driveshaft receives rotational motion from the engine. Drive pulley 110 is coupled to a distal portion or distal end of the driveshaft, such that drive pulley 110 rotates in accordance with the rotational motion received by the driveshaft from the engine of the motorcycle 102.

The intermediate-shaft assembly 106 includes an intermediate shaft (not shown in FIG. 1), an outer intermediate pulley wheel 112, and an inner intermediate pulley wheel (not shown in FIG. 1). Via drivebelt 108, intermediate-shaft assembly 106 is configured to receive rotational motion from drive pulley 110, and impart rotational kinetic energy upon an air compressor (or "blower") (not shown in FIG. 1) configured to channel compressed air back into the engine of the motorcycle 102, in order to increase a power output of the engine.

Figure 2A:
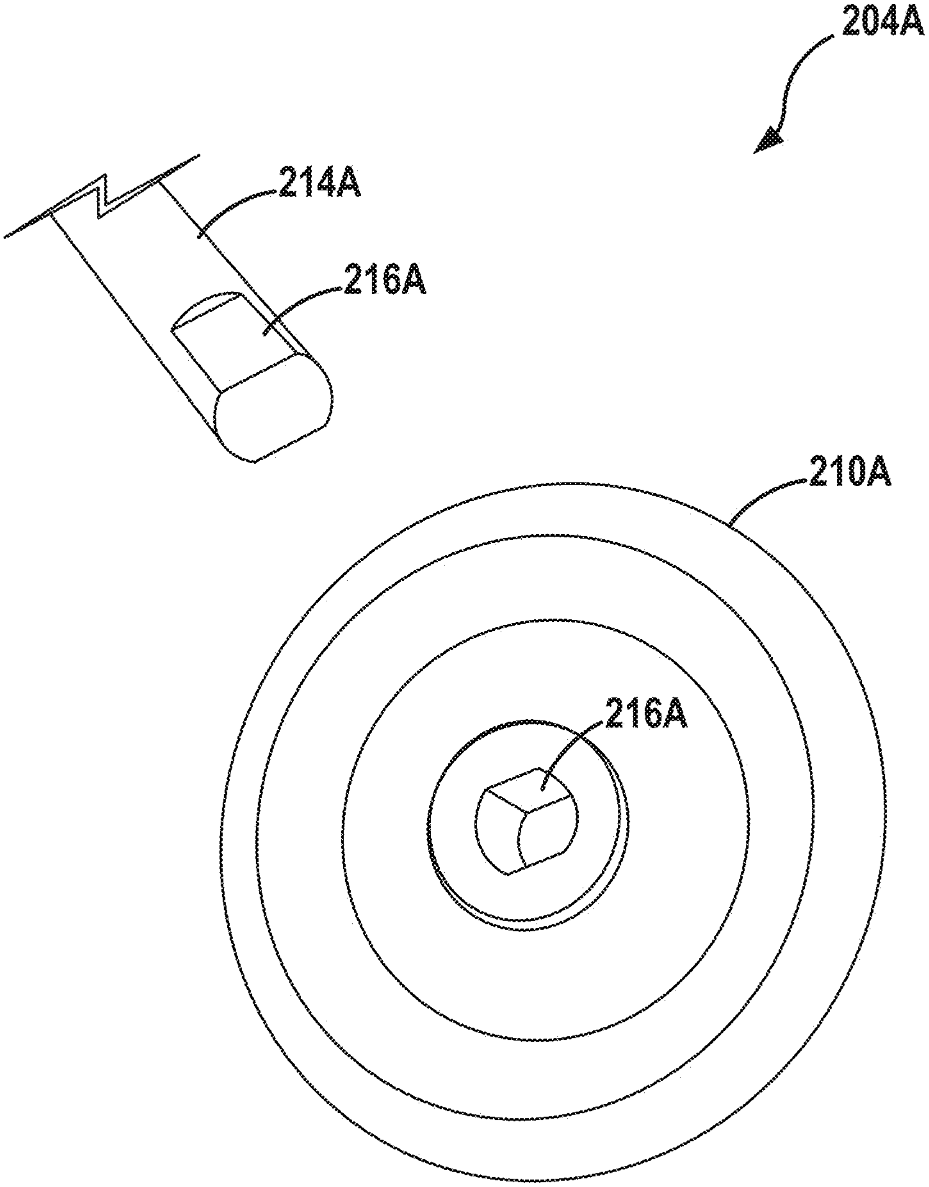
FIG. 2A (PRIOR ART)
FIG. 2A is a perspective view of a first example prior-art drive-pulley interface having a "Double-D" configuration.
Figure 2B:
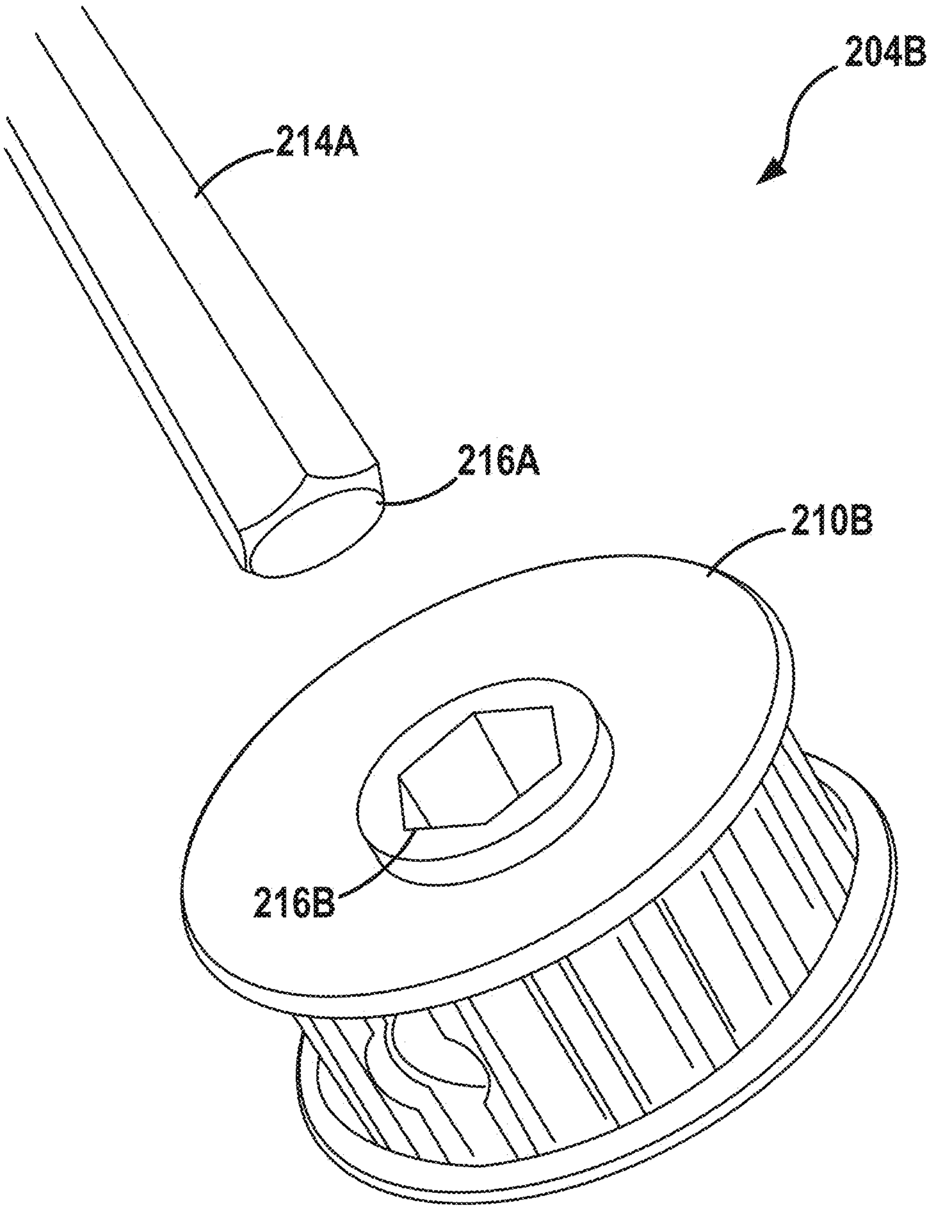
FIG. 2B (PRIOR ART)
FIG. 2B is a perspective view of a second example prior-art drive-pulley interface having a hex-key configuration.

FIG. 2A is a perspective view of a first example driveshaft assembly 204A, as currently known to those skilled in the relevant art. Driveshaft assembly 204A includes drive pulley wheel 210A and driveshaft 214A, mutually defining a driveshaft interface 216A between the two components. Specifically, driveshaft interface 216A is depicted as a "Double D"-type interface. Similarly, FIG. 2B is a perspective view of a second example driveshaft assembly 204B, as currently known to those skilled in the relevant art. Driveshaft assembly 204B includes drive pulley wheel 210B and driveshaft 214B, mutually defining a driveshaft interface 216B between the two components. Specifically, driveshaft interface 216A is depicted as a "Hex Key"-type interface.

Driveshaft assemblies 204A, 204B, widely implemented in the field of combustion-engine superchargers, both exhibit substantial deficiencies with respect to durability and longevity. That is, vibrational motion, which naturally results from standard operation of the motorcycle engine, causes frictional contact within the interface 216A/B between the drive pulley wheel 210A/B and the respective driveshaft 214A/B, which in turn, leads to rapid degradation of the driveshaft assembly 204A/B as a whole, and eventually, mechanical failure of the supercharger system.

Historically, this deficiency has been addressed by replacing one or more of the components with a more-durable material, such as steel instead of aluminum. However, the increased weight of such components substantially reduces the efficiency (and thus, power-output) of the engine, essentially negating the functionality of the supercharger in the first place. Thus, there exists a need for a supercharger system 100 (FIG. 1), formable using a relatively lightweight material, within which vibrational motion from the engine does not translate into degrading frictional contact between adjacent components.

FIGS. 3A-3D illustrate a novel driveshaft assembly 304 of one such supercharger system 100, in accordance with techniques of the present disclosure. As shown in FIGS. 3A-3D, driveshaft assembly 304 includes a main flywheel drive-pulley wheel 310 (e.g., drive pulley 110 of FIG. 1), a driveshaft 314 (e.g., driveshafts 214A/B of FIGS. 2A/B, respectively), and a compression bolt 318.

Drive pulley 310 and driveshaft 314 each feature counterpart components that mutually define a driveshaft interface 316. That is, driveshaft 314 includes a tapered distal portion 320, such that the distal end 322B of driveshaft 314 is narrower than the proximal end 322A of driveshaft 314. Concurrently, drive pulley wheel 310 defines a tapered central bore 324, which is configured to receive the tapered distal portion 320 of driveshaft 314.

Figure 3A:
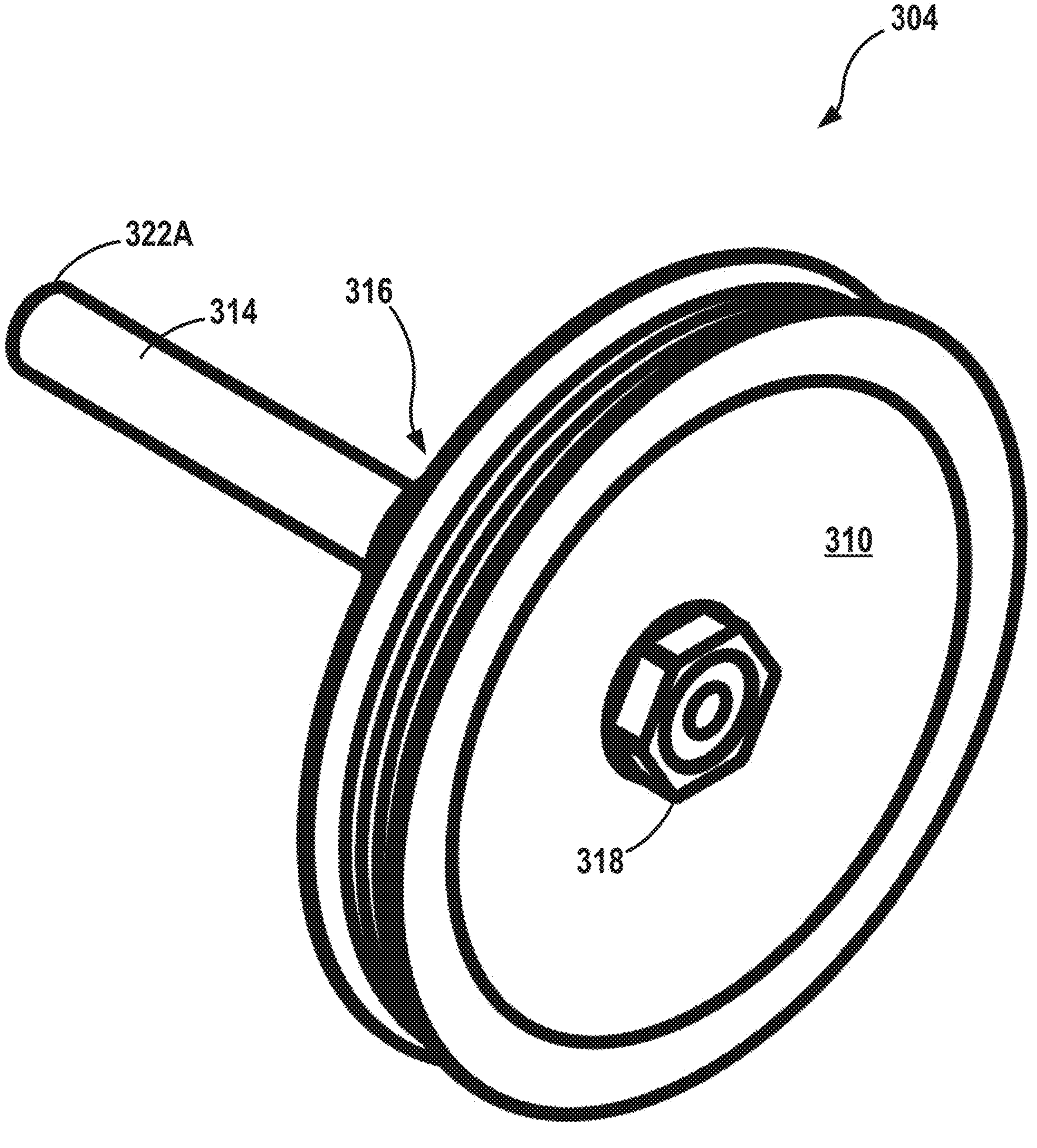
FIG. 3A is a first perspective view of an example driveshaft assembly for the supercharger system of FIG. 1, in accordance with techniques of this disclosure.
Figure 3B:
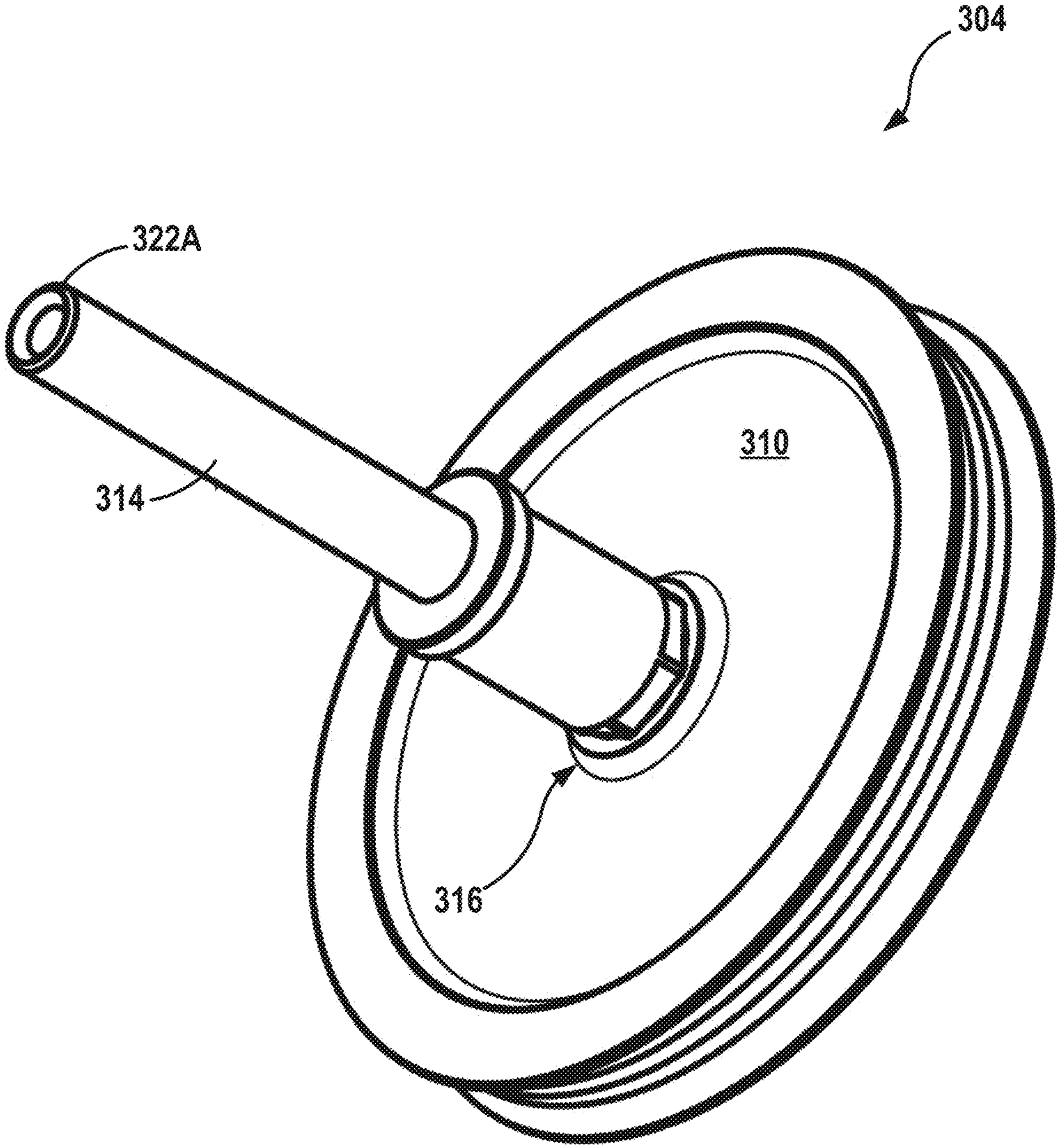
FIG. 3B is a second perspective view of the driveshaft assembly of FIG. 3A.
Figure 3C:
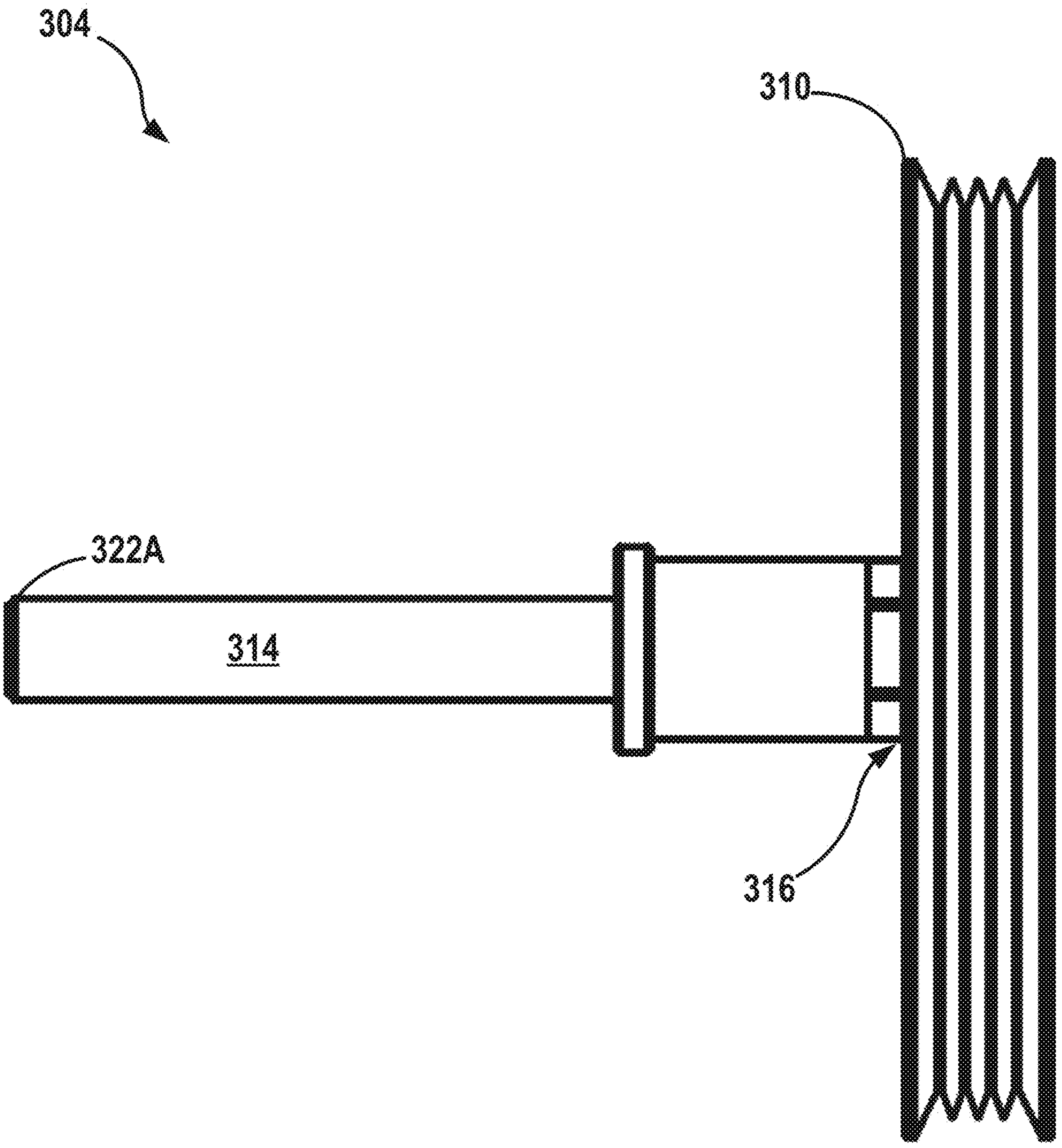
FIG. 3C is a side profile view of the driveshaft assembly of FIGS. 3A and 3B.
Figure 3D:
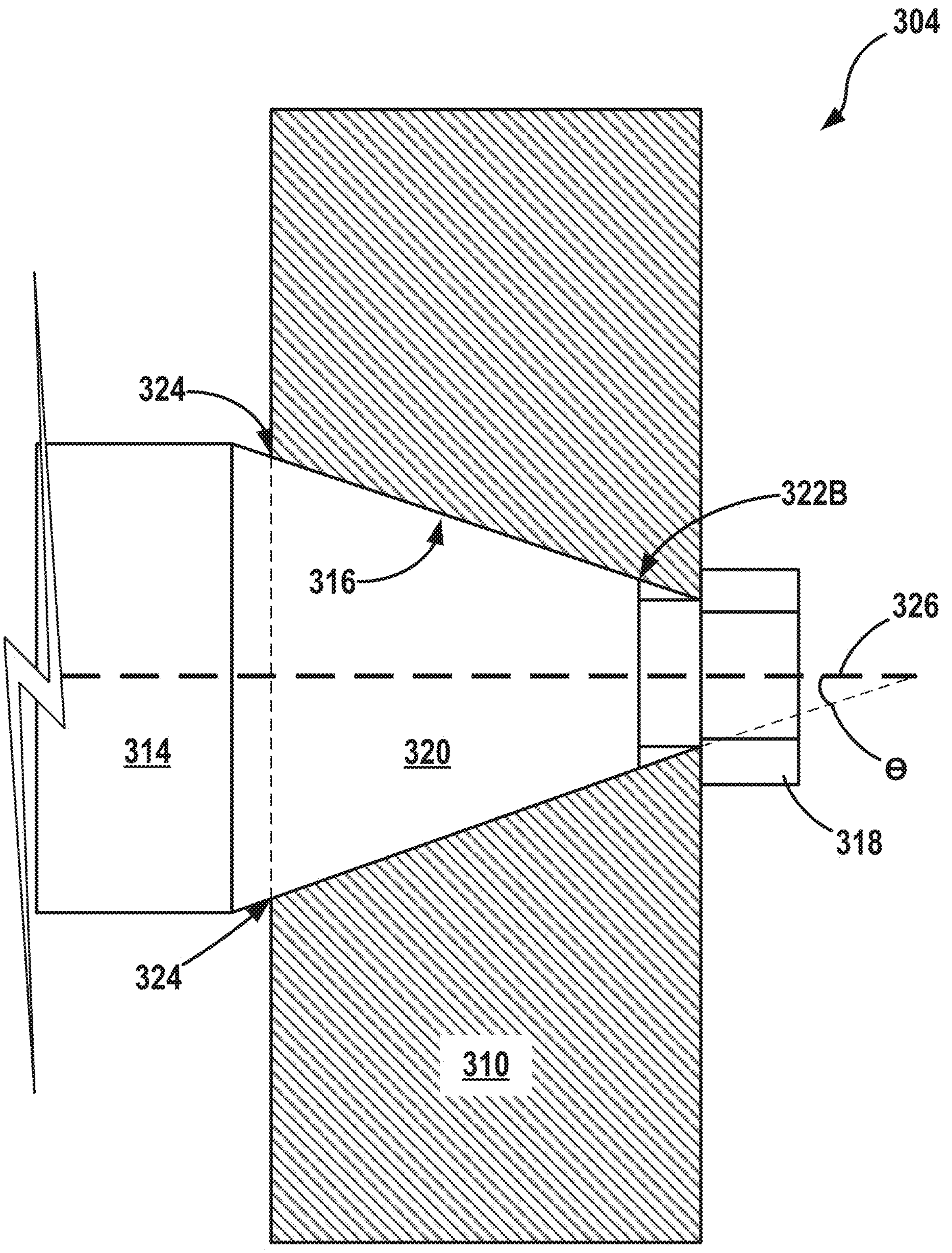
FIG. 3D is a cross-sectional side view of a portion of the driveshaft assembly of FIGS. 3A-3C, illustrating a novel tapered interference-fit interface between the two components thereof.
Figure 4A:
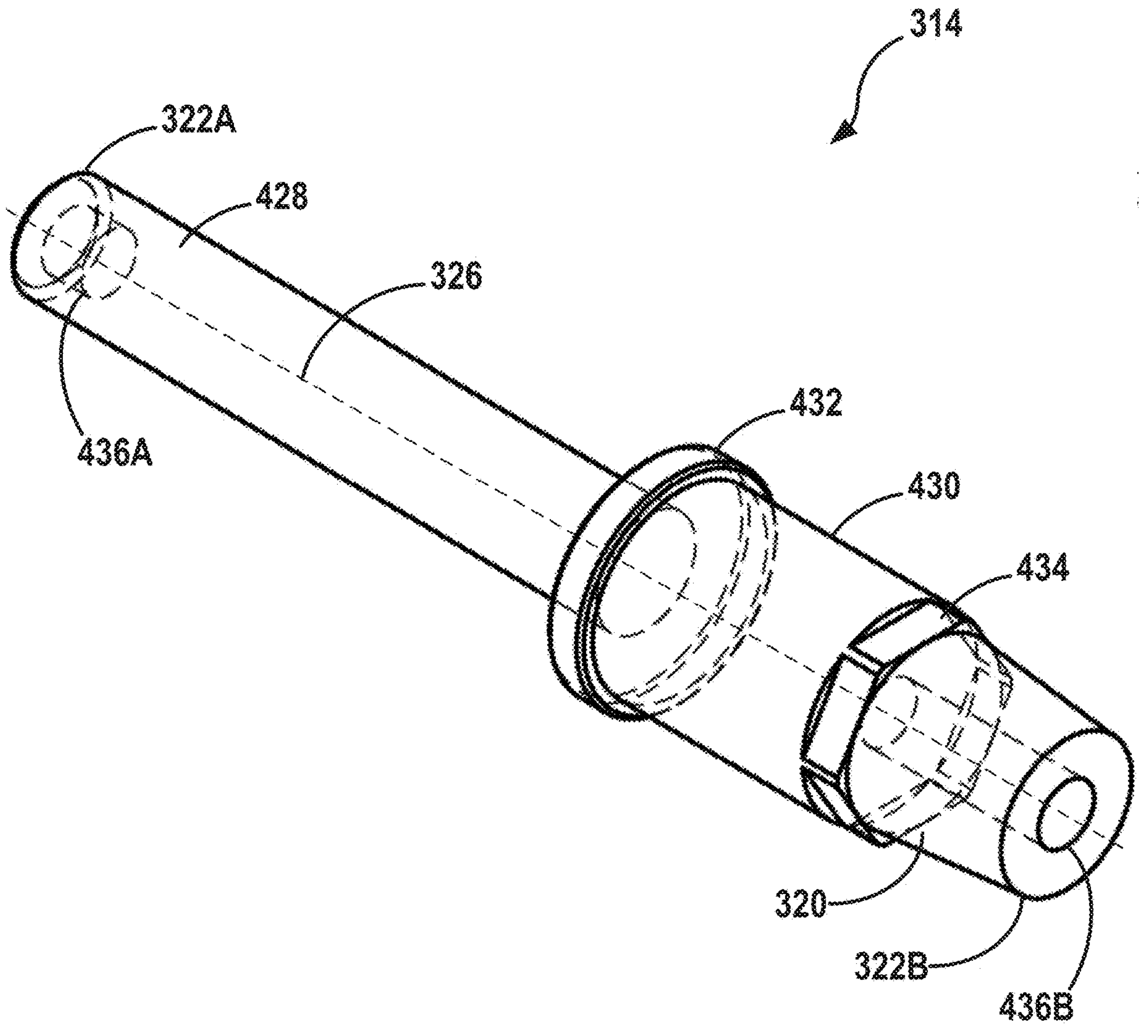
FIG. 4A is a perspective view of an example of a driveshaft for the driveshaft assembly of FIGS. 3A-3D.
Figure 4B:
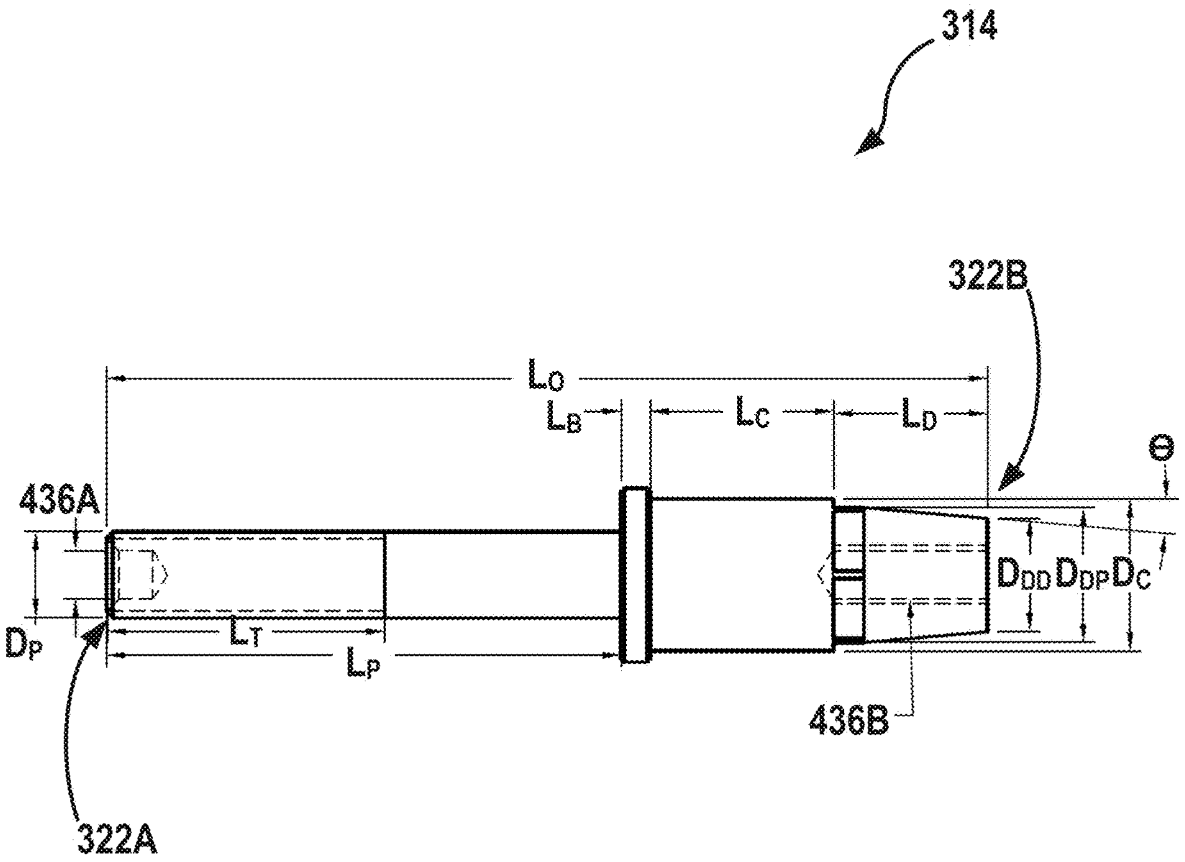
FIG. 4B is a transparent side-profile view of the driveshaft of FIG. 4A, showing some example specifications and dimensions thereof.
Figure 4C:
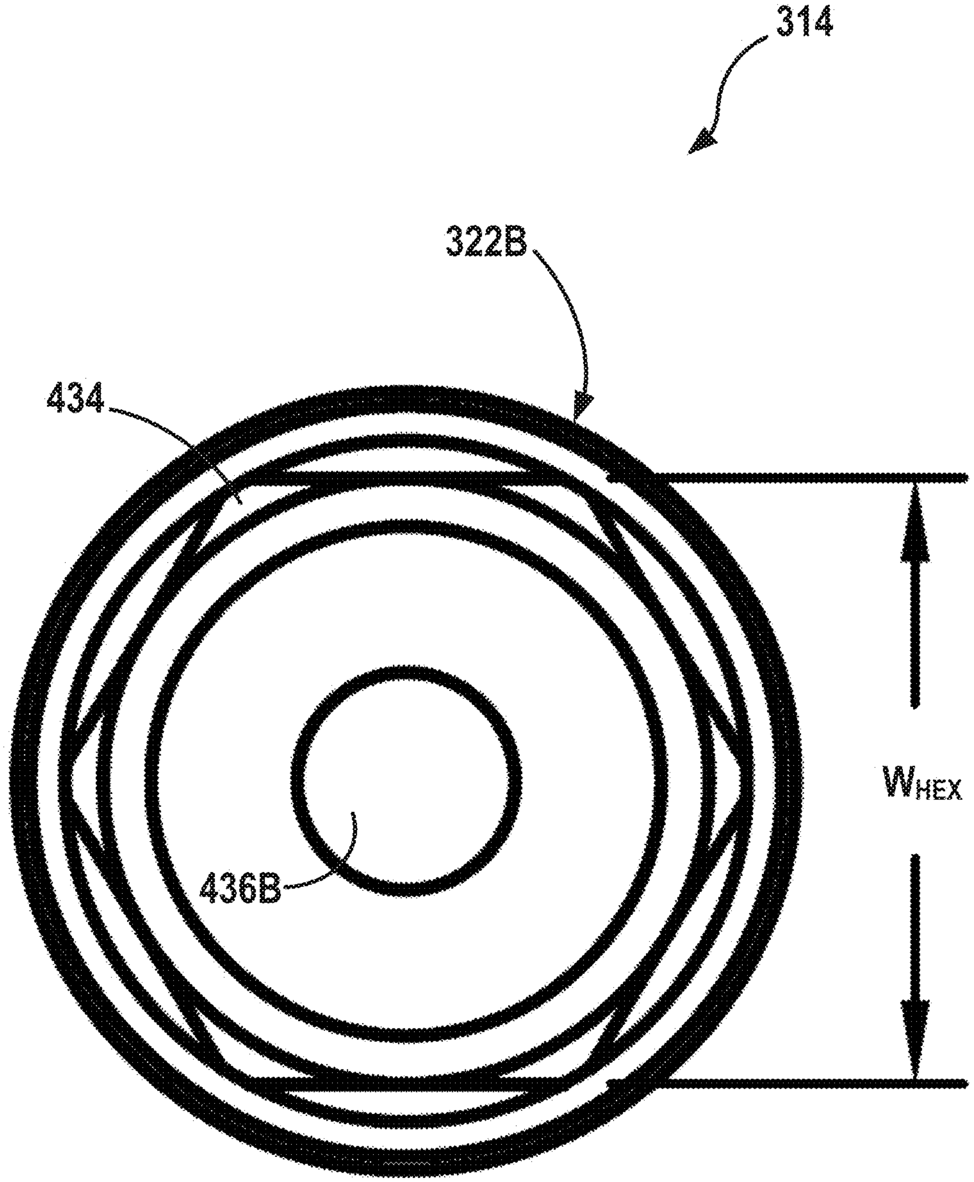
FIG. 4C is a distal-end profile view of the driveshaft of FIGS. 4A and 4B.

Based primarily on frictional contact between driveshaft 314 and drive pulley wheel 310 (compared to more-permanent couplings, such as welding), driveshaft interface 316 belongs to the "interference fit" category of mechanical junctions. More specifically, driveshaft interface 316 comprises a "locking taper" interface—not to be confused with a "taper lock" mechanism also encountered in some such systems. Notably, and in accordance with techniques of the present disclosure, the locking taper interface 316 defines a "self-locking" taper angle "O" ("theta") of less than about 12° relative to the central longitudinal axis 326 of driveshaft assembly 304, or equivalently, relative to the central axis of rotation of driveshaft 314. In preferred examples, taper angle θ is less than about 8°, such as between about 5° and 7°. FIGS. 4A-4C show an example of driveshaft 314 of the driveshaft assembly 304 of FIGS. 3A-3D. Driveshaft 314 can be formed from any suitably durable, and preferably lightweight, material, including, as just a few non-limiting examples: aluminum, carbon fiber, steel, brass, and the like.

In addition to tapered distal portion 320, driveshaft 314 can include one or more other portions arranged longitudinally along central longitudinal axis 326. For instance, as shown in FIG. 4A, driveshaft 314 can include a substantially linear (i.e., non-tapered) proximal portion 428 and a central portion 430. Additionally, or alternatively, driveshaft 314 can include a bearing catch 432 configured to longitudinally restrict a roller bearing (not shown in FIG. 4A), and a hexagonal portion 434 for securing a wrench during installation. Driveshaft 314 further defines at least one central bore, which may include a proximal central bore 436A and a distal central bore 436B, e.g., in implementations in which a single central bore does not extend all the way through the interior of driveshaft 314. In some such cases, distal central bore 436B may be threaded in order to receive and retain a compression bolt 318 (FIG. 3A).

FIG. 4B is a transparent side-profile view of the driveshaft 314 of FIG. 4A, showing some example, non-limiting specifications and dimensions thereof. It is to be understood that any dimensional value recited throughout this disclosure: (1) refers to "inches" unless otherwise specified; (2) is intended solely to illustrate the general centerpoint of a contemplated range of values that extends about ±50% of the example value provided; and (3) inherently encompasses a manufacturing tolerance of ±10% of the example value provided (as indicated by the modifier "about" or "around").

For instance, as shown in FIG. 4B, driveshaft 314 can have an overall length "$L_O$," as measured between proximal end 322A and distal end 322B, of between about 2.85" and about 8.55", preferably around 5.7" (e.g., preferably between about 5.13 inches and about 6.27 inches, inclusive).

Bearing catch 442 can have a longitudinal length $L_B$ of about 0.1 inches to about 0.3 inches, preferably around 0.19 inches (e.g., preferably between about 0.171 inches and about 0.209 inches, inclusive).

Proximal portion 428 can have a longitudinal length $L_P$ of about 1.66 inches to about 4.99 inches, preferably around 3.33 inches; and an outer diameter $D_P$ of about 0.28 inches to about 0.84 inches, preferably around 0.56 inches. Some or all of the non-tapered proximal portion 428 of driveshaft 314 can feature an exterior threading for engaging with the engine of a motorcycle 102 (FIG. 1). For instance, the proximal portion 428 can include a threaded length LT of about 0.9 inches to about 2.7 inches, inclusive, preferably around 1.8 inches (e.g., about 1.62 inches to about 1.98 inches, inclusive). Such threading can include, as just one non-limiting example: 9/16" major diameter; 12 threads per inch; unified coarse (UNC); and Class 3 external threading.

Tapered distal portion 320 can have a longitudinal length $L_D$ of about 0.5 inches to about 1.5 inches, preferably around 0.99 inches. The distal end 322B can define a central distal bore 436B having an inner diameter of about 0.314 inches. At the proximal end 322A, the proximal central bore 436A can have an inner diameter of about 0.31 inches.

Central portion 430 can have a longitudinal length $L_C$ of about 0.6 inches to about 1.8 inches, preferably around 1.19 inches; and an outer diameter $D_C$ of about 0.5 inches to about 1.5 inches, inclusive, preferably around 0.98 inches.

FIG. 4C is a distal-end profile view of the driveshaft 314 of FIGS. 4A and 4B. As shown in FIG. 4C, the hexagonal portion 434 can have a width $W_{HEX}$ of about 0.88 inches.

Figure 5A:
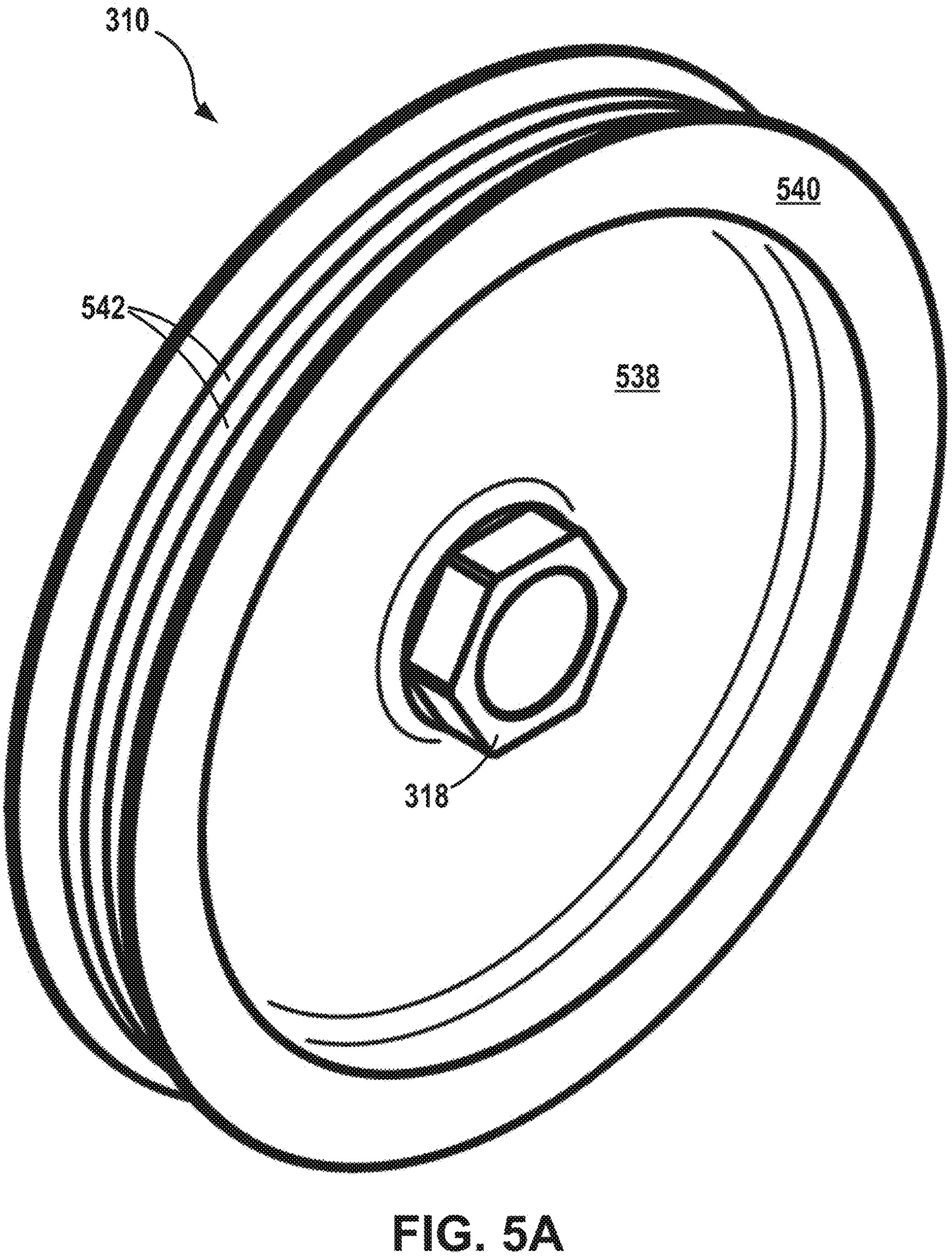
FIG. 5A is a perspective view of an example of a flywheel drive pulley for the driveshaft assembly of FIGS. 3A-3D.

FIG. 5A is a perspective view of an example of flywheel drive pulley 310 and compression bolt 318. In some examples (but not all examples), drive pulley 310 includes a disc-shaped flange 538, and an outer rim 540 extending around an outer circumference of the flange 538. In the example shown in FIG. 5A, outer rim 540 defines a plurality of annular grooves 542 extending around the circumference of the rim. In other examples, in place of a circumferential outer rim 540, flywheel drive pulley 310 can include a plurality of axial gear teeth (not shown) distributed evenly around the outer circumference of the central flange.

Figure 5B:
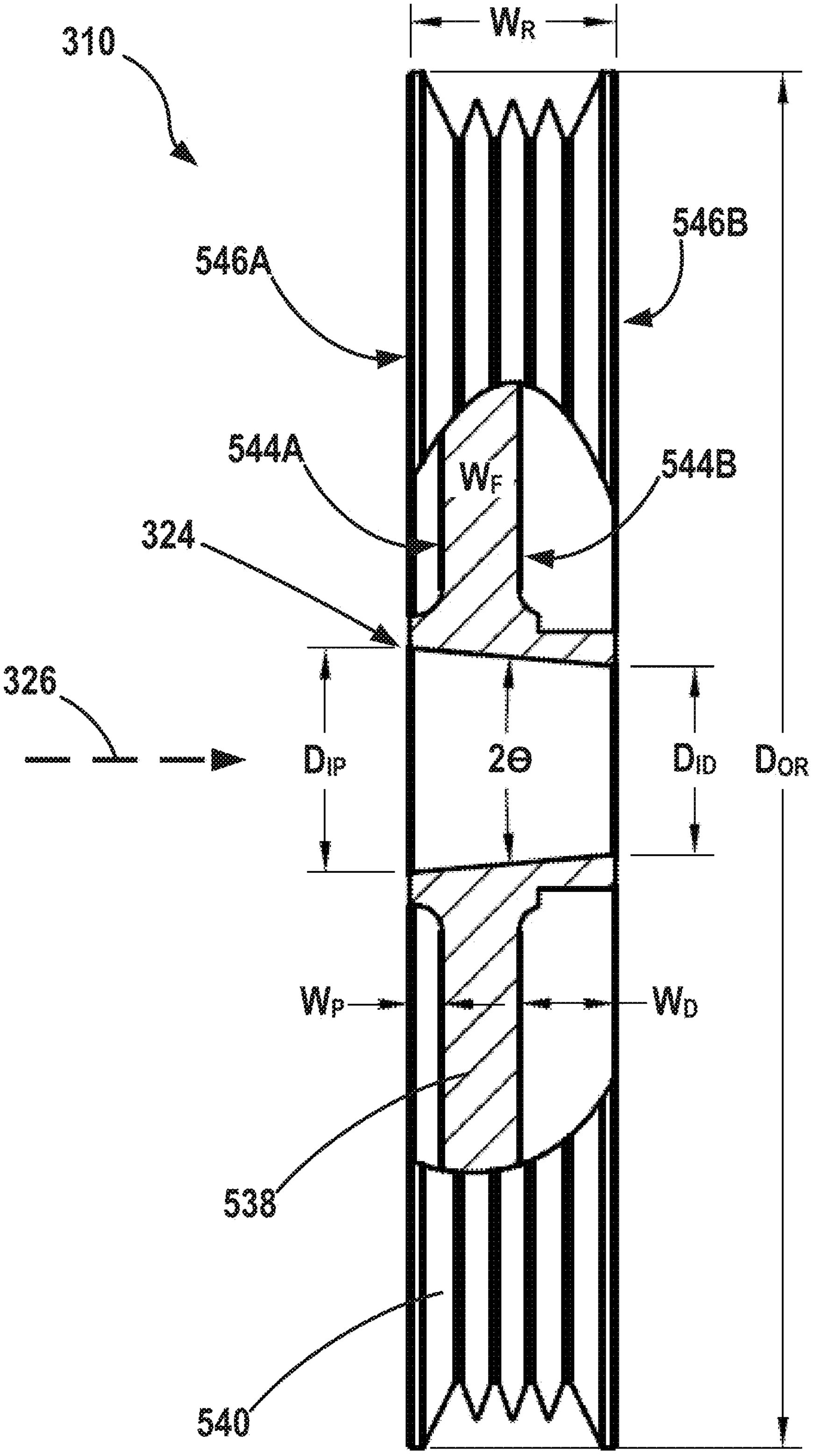
FIG. 5B is a partial-cutaway side-profile view of the flywheel drive pulley of FIG. 5A, showing some example specifications and dimensions thereof.
Figure 5C:
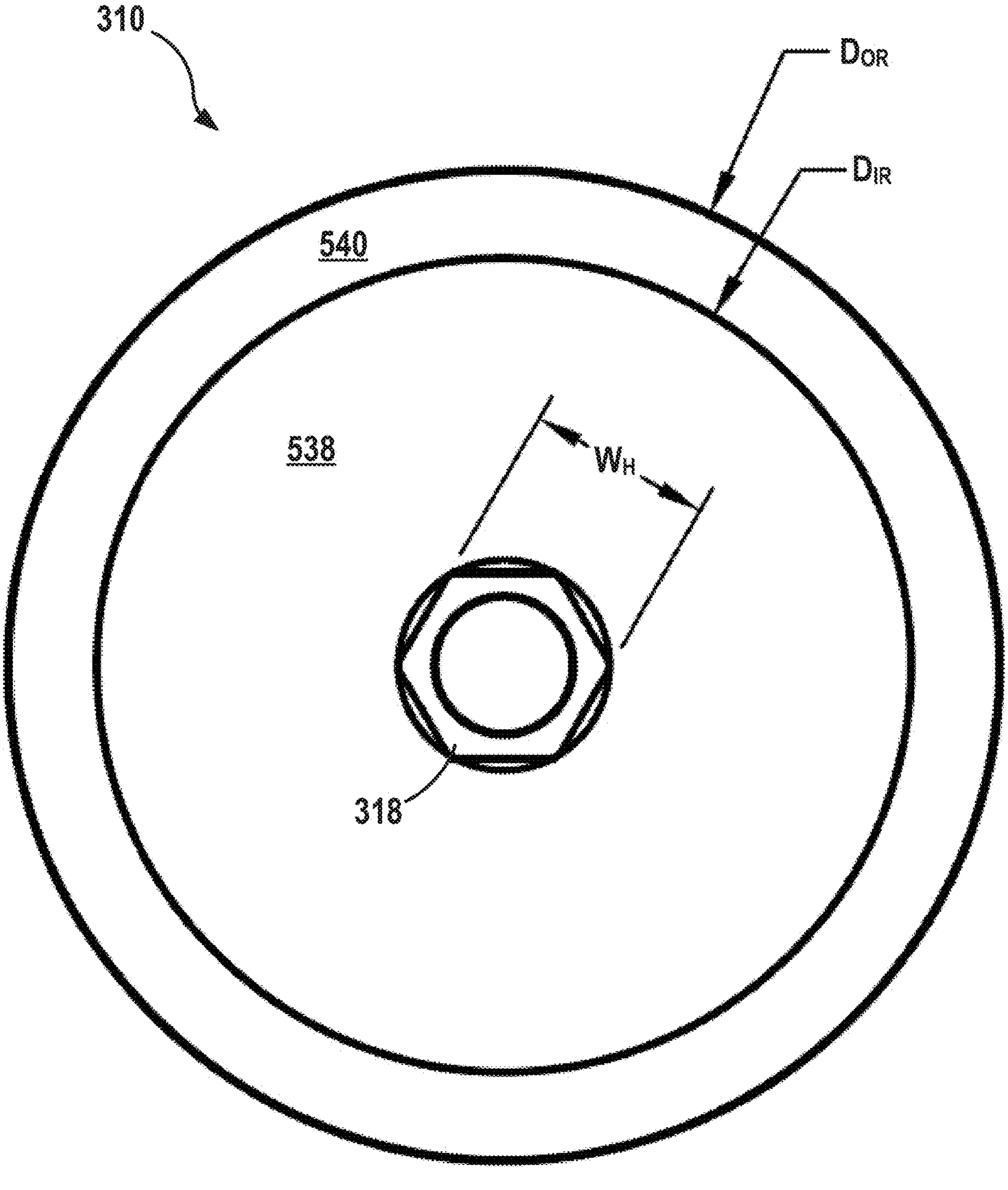
FIG. 5C is a distal-end profile view of the flywheel drive pulley of FIGS. 5A and 5B, showing some example specifications and dimensions thereof.

FIGS. 5B and 5C show some example specifications and dimensions for the flywheel drive-pulley wheel 310 of FIG. 5A. Notably, as shown in FIG. 5B, pulley wheel 310 defines a tapered central bore 324 having an angle of 2θ, or in other words, an angle of θ extending on either opposite side of central longitudinal axis 326. At its proximal aperture, tapered central bore 324 can define an inner diameter Dip of about 0.435 inches to about 1.305 inches, preferably around 0.87 inches. At its distal aperture, tapered central bore 324 can define an inner diameter $D_{ID}$ of about 0.37 inches to about 1.11 inches, preferably around 0.74 inches.

As just one non-limiting, illustrative example, the outer rim 540 of flywheel drive pulley wheel 310 can define an outer diameter DOR of about 2.675 inches to about 8.025 inches, preferably around 5.35 inches. However, a person of skill in the art will recognize that the outer diameter of pulley wheel 310, and more specifically, the ratio between the diameters of pulley wheel 310 and outer intermediate pulley wheel 112 (FIG. 1), may be varied according to user preference to modify the transfer of rotational motion from the engine into the supercharger's air blower. Any such variations remain soundly within the scope of the present disclosure.

In the example shown in FIG. 5B, disc-shaped flange 538 is not centered longitudinally relative to the outer rim 540; instead, flange 538 is biased toward the proximal side of the rim 540. As an illustrative, non limiting example, the proximal face 544A of flange 538 might be a proximal width $W_P$ of just about 0.13 inches from the proximal edge 546A of outer rim 540; by contrast, the distal face 544B of flange 538 might be distal width $W_D$ of more than twice that distance-such as about 0.38 inches-away from the distal edge 546B of outer rim 540.

Flange 538 can define a longitudinal width $W_F$ (e.g., as measured between the proximal and distal faces 544A/B) of about 0.145 inches to about 0.435 inches, inclusive, preferably around 0.29 inches (e.g., about 0.261 inches to about 0.319 inches, inclusive).

In some examples, outer rim 540 can define a longitudinal width $W_R$ (e.g., as measured between the proximal and distal edges 546A/B) of between about 0.4 inches and about 1.2 inches, inclusive, preferably around 0.8 inches (e.g., about 0.72 inches to about 0.88 inches, inclusive).

As shown in FIG. 5C, outer rim 540 might further define an inner diameter DIR of about 2.19 inches to about 6.57 inches, preferably around 4.38 inches (e.g., between about 3.942 inches and about 4.818 inches, inclusive). Compression bolt 318, which in some cases can be a tapered hex bolt, might define a head width $W_H$ of about 1 inch.

Figure 6A:
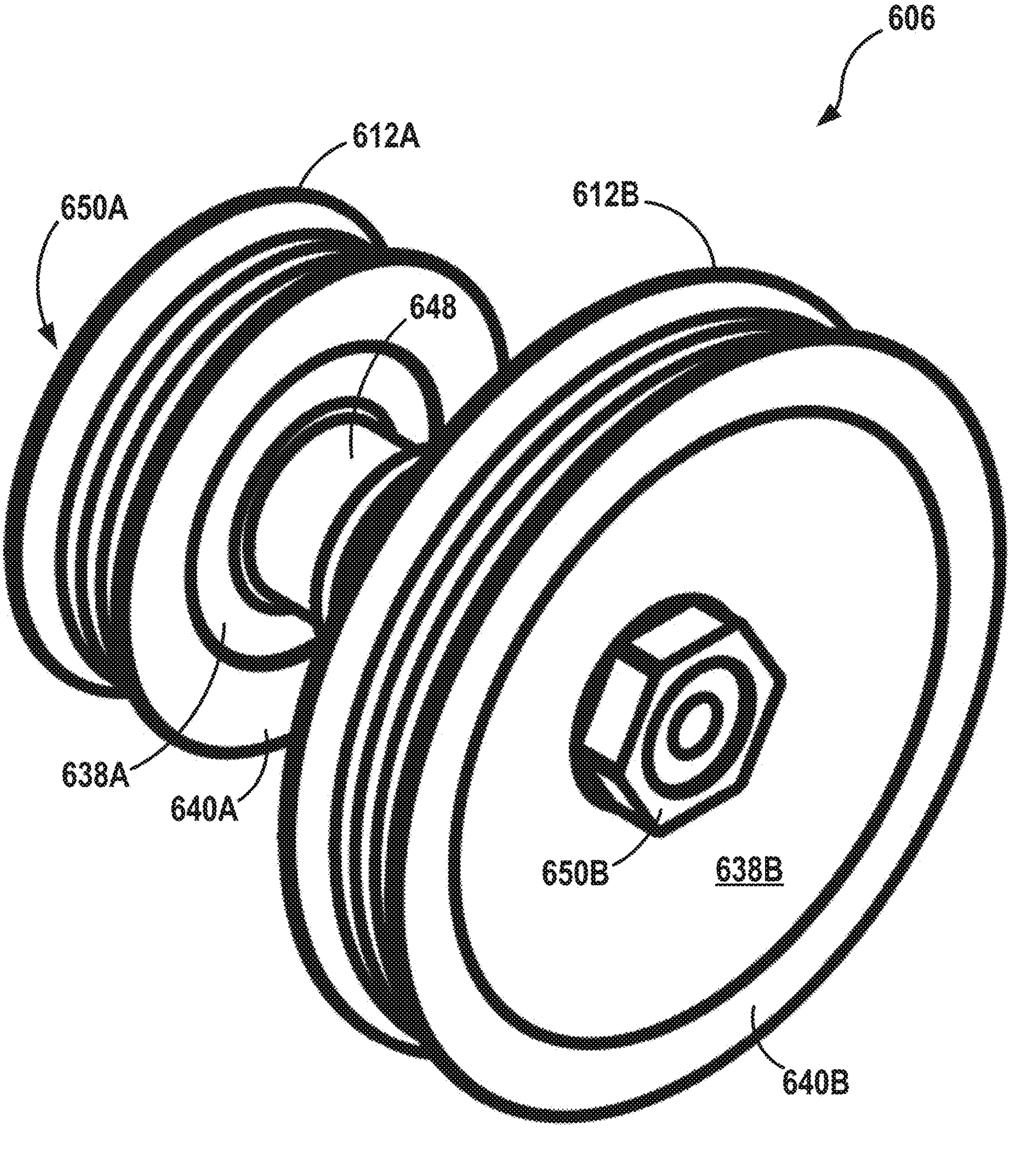
FIG. 6A is a perspective view of an example intermediate-shaft assembly for the supercharger system of FIG. 1, in accordance with techniques of this disclosure.
Figure 6B:
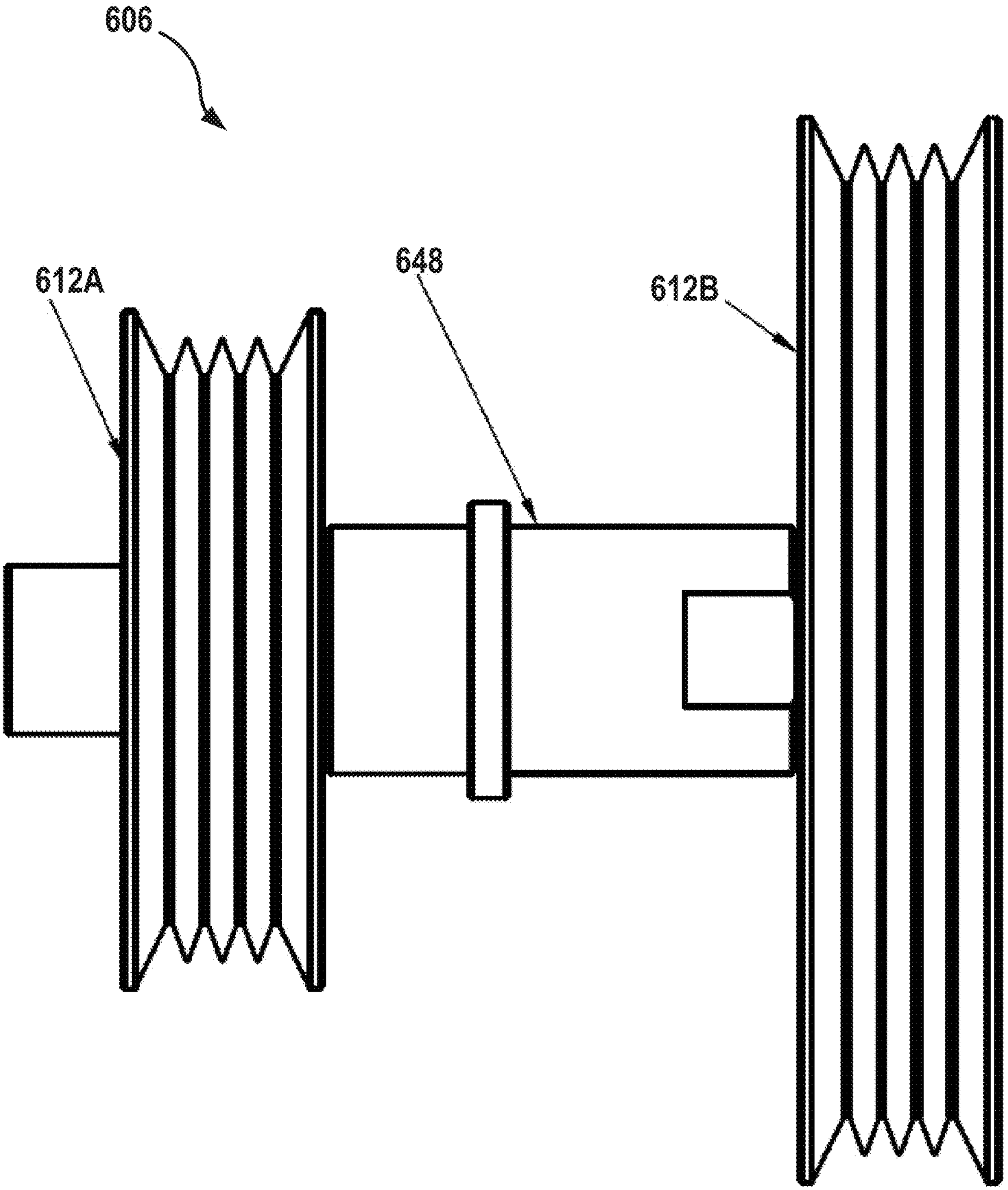
FIG. 6B is a side profile view of the intermediate-shaft assembly of FIG. 6A.

FIG. 6A is a perspective view of an example intermediate-shaft assembly 606, which is an example of intermediate-shaft assembly 106 of supercharger system 100 of FIG. 1; FIG. 6B is a side profile view of the intermediate-shaft assembly 606 of FIG. 6A. As shown in FIGS. 6A and 6B, intermediate shaft assembly 606 includes: outer intermediate pulley wheel 612A (e.g., pulley wheel 112 of FIG. 1); intermediate shaft 648; inner intermediate pulley wheel 612B; and proximal/distal compression bolts 650A/650B. In accordance with the techniques of this disclosure, each of intermediate pulley wheels 612A, 612B may be structural counterparts of flywheel drive pulley 310—that is, may each include structural features corresponding to any or all of those described above with respect to flywheel drive pulley 310. Similarly, intermediate shaft 648 may be a structural counterpart of driveshaft 314, i.e., may include similar structural features, including tapered proximal and/or distal portions, to form locking-taper interface(s) with intermediate pulley wheels 612A, 612B.

Figure 7A:
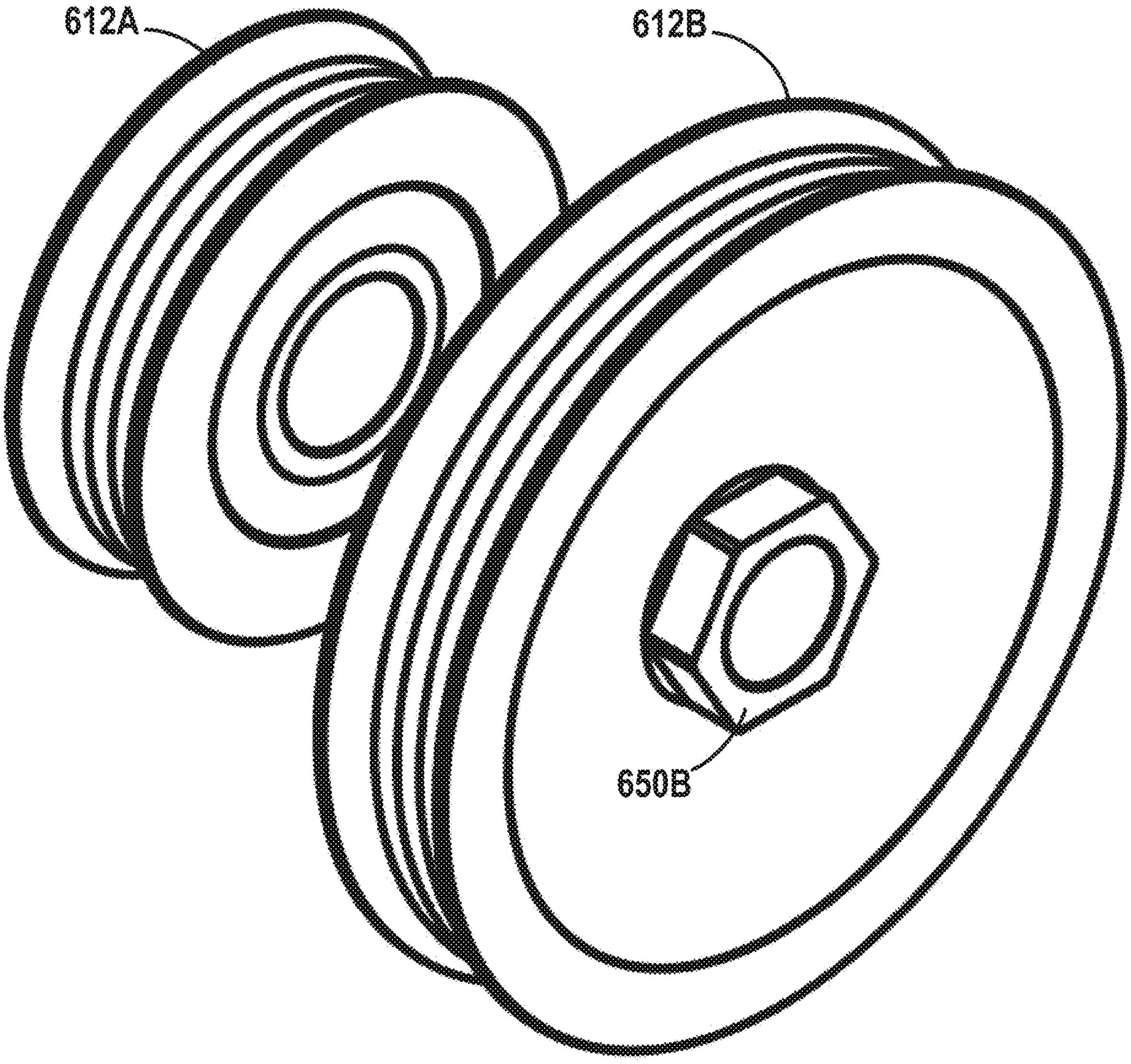
FIG. 7A is a perspective view of an outer intermediate pulley and an inner intermediate pulley of the intermediate-shaft assembly of FIGS. 6A and 6B.
Figure 7B:
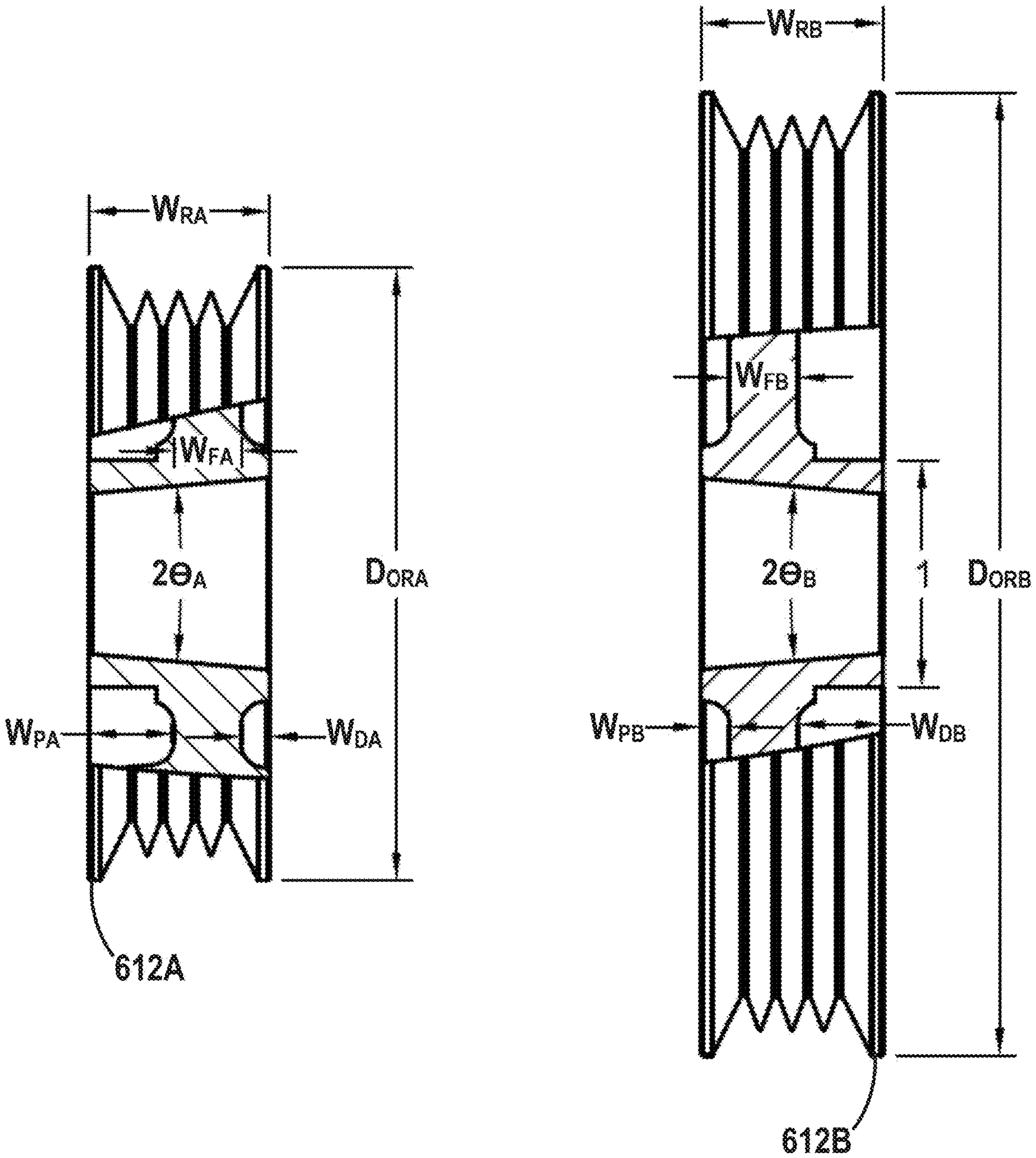
FIG. 7B is a partial-cutaway side-profile view of the outer intermediate pulley and the inner intermediate pulley of FIG. 7A.
Figure 7C:
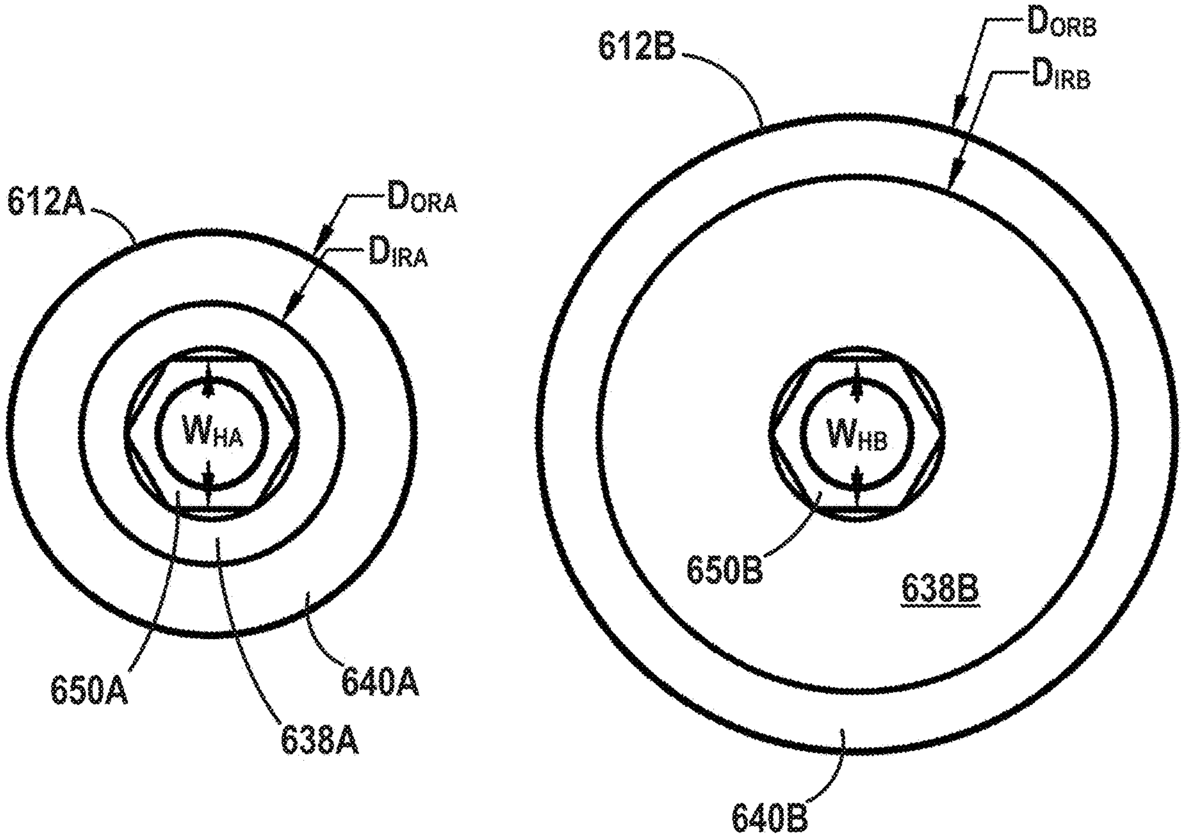
FIG. 7C is a proximal-end profile view of the outer intermediate pulley and a distal-end profile view of the inner intermediate pulley of FIGS. 7A and 7B.

FIGS. 7A-7C show some example dimensions of outer and inner intermediate pulley wheels 612A, 612B of intermediate-shaft assembly 606 of FIGS. 6A and 6B. While structurally analogous to flywheel drive pulley 310, intermediate pulley wheels 612A, 612B notably differ in size. As just one illustrative, non-limiting example, outer intermediate pulley wheel 612A can have an outer diameter $D_{ORA}$ between about 1.35 inches and about 4.05 inches, inclusive, preferably around 2.7 inches (e.g., about 2.43 inches to about 2.97 inches, inclusive). By contrast, as another illustrative, non-limiting example, inner intermediate pulley wheel 612B may be larger than outer intermediate pulley wheel 612A, but still smaller than flywheel drive pulley wheel 310, e.g., having an outer diameter $D_{ORB}$ between about 2.125 inches and about 6.375 inches, inclusive, preferably around 4.25 inches (e.g., about 3.825 inches to about 4.675 inches, inclusive).

Figure 8A:
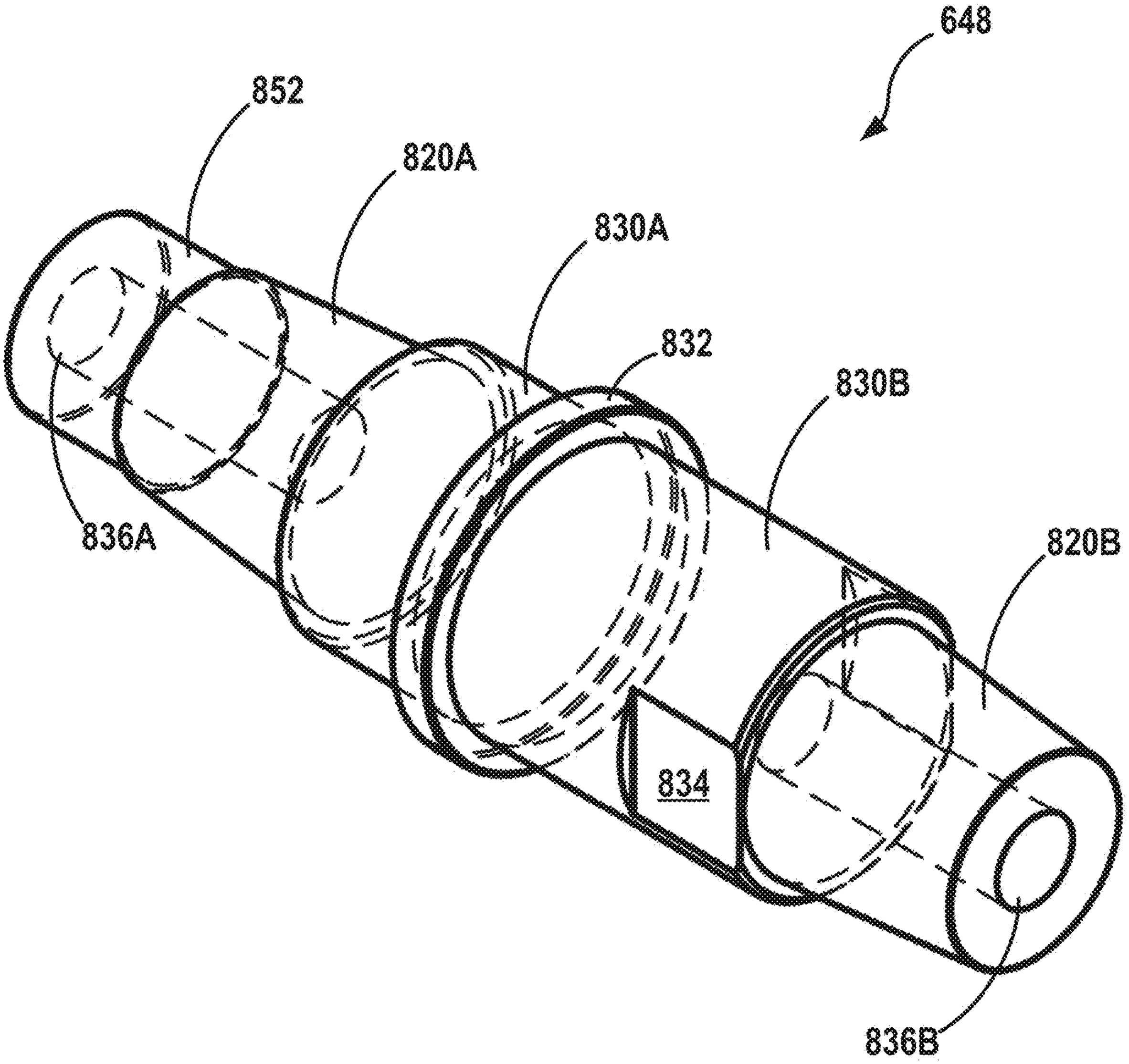
FIG. 8A is a perspective view of an example intermediate shaft for the intermediate-shaft assembly of FIGS. 6A and 6B.
Figure 8B:
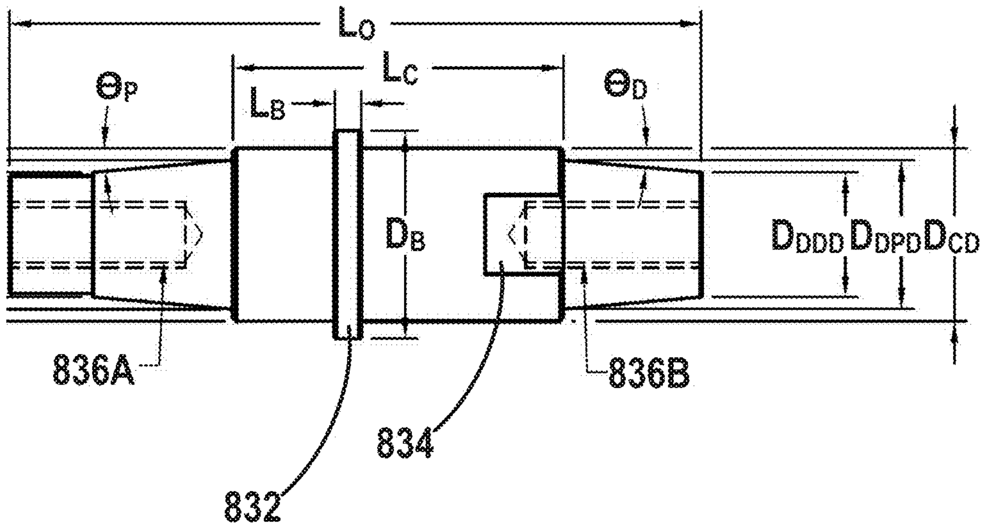
FIG. 8B is a transparent side profile view of the intermediate shaft of FIG. 8A, showing some example specifications and dimensions thereof.
Figure 8C:
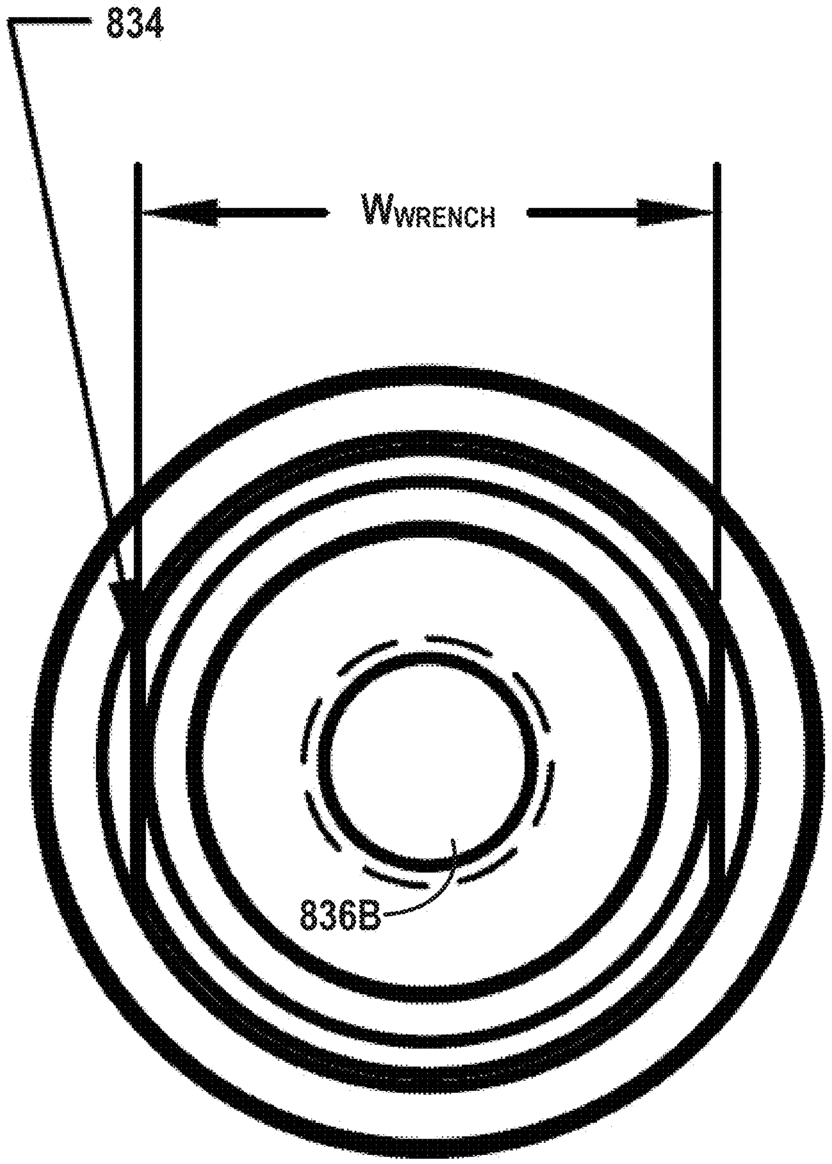
FIG. 8C is a distal-end profile view of the intermediate shaft of FIGS. 8A and 8B, showing an example dimension thereof.

FIGS. 8A-8C show some example sub-structures and dimensions of intermediate shaft 648 of intermediate-shaft assembly 606 of FIGS. 6A and 6B. Intermediate shaft 648 can include both a tapered proximal portion 820A (defining a proximal taper angle $\theta_P$) configured to form a locking-taper interface with outer intermediate pulley wheel 612A, and also a tapered distal portion 820B (defining a distal taper angle $\theta_D$) configured to form a locking taper interface with inner intermediate pulley wheel 612B. Intermediate shaft 648 can further include one or more non-tapered central portions 830A, 830B; a bearing catch 832; and a keyed portion 834 defining a pair of parallel wrench flats to facilitate installation of the intermediate shaft 648. As shown in FIG. 8C, keyed portion 834 can define a width $W_{WRENCH}$ of about 0.44 inches to about 1.32 inches, inclusive, preferably around 0.88 inches (e.g., about 0.792 inches to about 0.968 inches, inclusive). In some examples, the intermediate shaft 648 includes a proximal-most extension 852.

Figure 9:
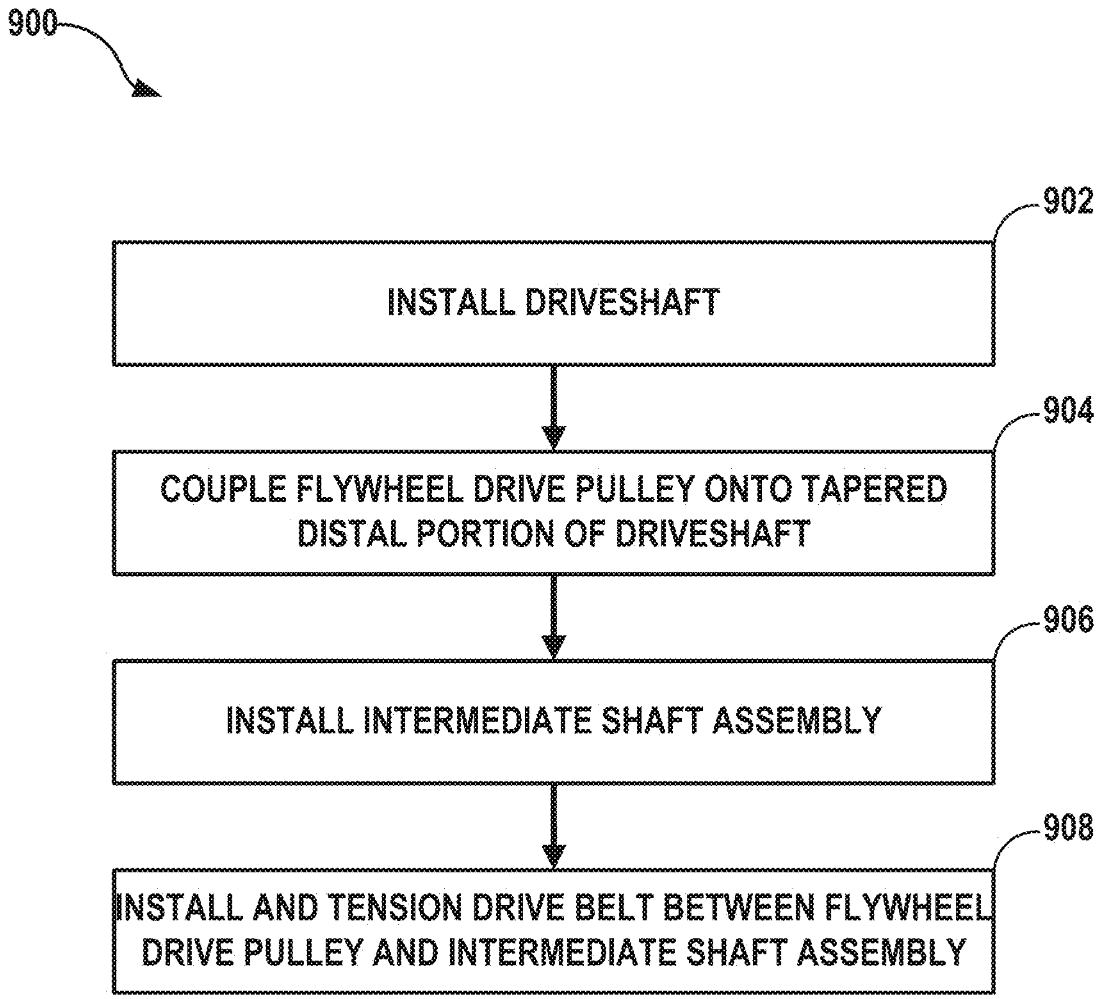
FIG. 9 is a flowchart illustrating an example technique for installing the supercharger system of FIG. 1 onto a motorcycle engine.

FIG. 9 is a flowchart 900 illustrating an example process for installing a supercharger system (e.g., system 100 of FIG. 1) onto a motorcycle 102, in accordance with one or more techniques of the present disclosure. At Step 902, the process includes rotatably coupling a driveshaft 314 to the output of the motorcycle's engine, e.g., by engaging external threading on a proximal portion 428 of the driveshaft to the motor's output.

At Step 904, the process further includes coupling a flywheel drive pulley 310 onto a tapered distal portion 320 of the driveshaft 314, e.g., by inserting the tapered distal portion 320 into a counterpart tapered central bore 324 of the drive pulley 310 to form a locking-taper. The drive pulley may be rigidly secured in place by securing a compression bolt, such as a tapered bolt, onto the distal-most end 322B of the driveshaft 314.

At Step 906, the process further includes installing an intermediate shaft assembly 606 onto the motorcycle, e.g., by coupling an inner intermediate pulley wheel 612B to a tapered distal end of an intermediate shaft 648, opposite an outer intermediate pulley wheel 612A. Finally, at Step 908, the process further includes securing and tensioning a drive belt 108 between the drive pulley wheel 110/310 and the outer intermediate pulley wheel 112/612A.

Figure 10:
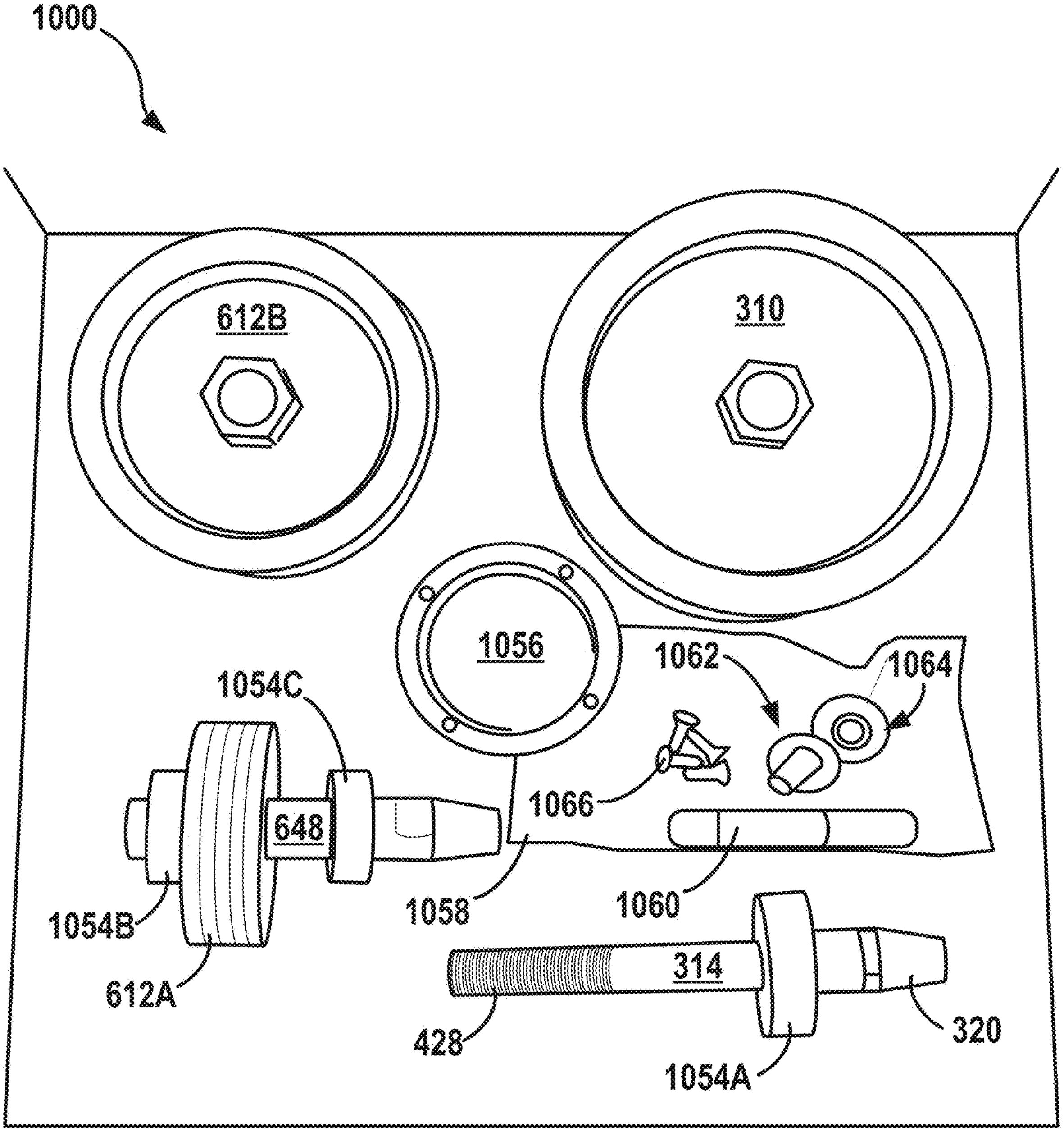
FIG. 10 is an overhead view of an example supercharger-enhancement kit configured to be retro-fitted to a separate motorcycle-supercharger system.

FIG. 10 is an overhead view of an example supercharger-enhancement kit 1000 configured to be retro-fitted to a separate motorcycle-supercharger system (not shown), in order to incorporate the advantages and benefits of the techniques described herein to increase the effectiveness of the supercharger system. In the example shown in FIG. 10, the supercharger-enhancement kit 100 includes: a flywheel drive pulley 310; a driveshaft 314 with a first roller bearing 1054A (e.g., a 25×52×15, open roller bearing); an intermediate shaft 648 with an outer/proximal intermediate pulley wheel 612A, a second (outer/proximal) roller bearing 1054B (e.g., a 17×40×12, sealed roller bearing), and a third (inner/distal) roller bearing 1054C (e.g., a 25×47×12, sealed roller bearing), and in some examples, a flathead cap screw (not shown) (e.g., 3/8-16×3/4) and a beveled washer (not shown) (e.g., ⅜" inner diameter); an inner/distal intermediate pulley wheel 612B; a cover cap 1056; and a hardware pack 1058 including: a tube of liquid thread-locker adhesive 1060 (e.g., Vibra-Tite 150 Med Wicking), two hex bolts 1062 (e.g., Gr-8 3/8-16×3/4), two flat-thrust washers 1064 (e.g., ⅜" inner diameter), and four flathead cap screws 1066 (e.g., #8-32×1/2).

Figure 11:
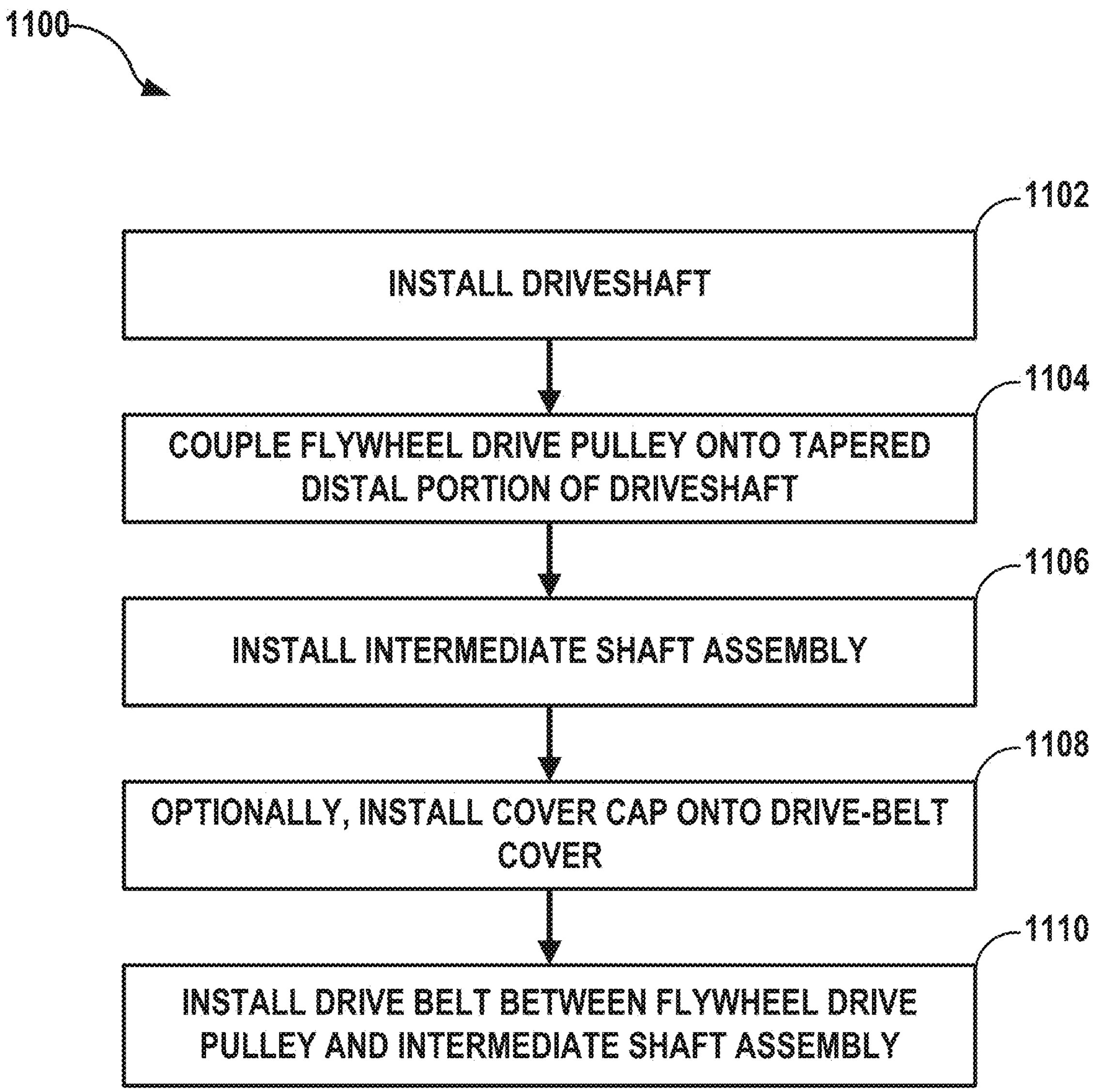
FIG. 11 is a flowchart illustrating an example technique for installing the supercharger-enhancement kit of FIG. 10 onto a motorcycle engine.

FIG. 11 is a flowchart 1100 illustrating an example process for incorporating the supercharger-modification kit 1000 of FIG. 10 into a separate motorcycle-supercharger system while installing the supercharger system onto a motorcycle's engine.

At Step 1102, the process includes installing the new driveshaft 314 and roller bearing 1054A from the kit 1100 onto an output of the motorcycle engine, e.g., by engaging the external threads along the proximal portion 428 of the driveshaft 314.

At Step 1104, the process includes installing the flywheel drive pulley 310 from the kit 1100, for instance, by: (1) applying liquid thread locker to the tapered central bore 324 of the drive pulley 310, and to the tapered distal portion 320 of the driveshaft 314; (2) inserting the tapered central bore 324 overtop of the tapered distal portion 320 of the driveshaft 314 and seating the drive pulley 310 by lightly tapping with a dead blow hammer; (3) securing the pulley wheel 310 to the driveshaft 314 with a compression bolt 318 (e.g., a 3/8-16×3/4" bolt) and flat-thrust washer, along with more liquid thread locker; (4) while using a wrench to hold the pulley wheel 310 in place, applying about 30 ft·lbs of torque to the compression bolt 318.

At Step 1106, the process further includes securing the intermediate shaft 648 of the enhancement kit 110 onto a main bracket of the supercharger system, e.g., by: (1) removing the original intermediate-shaft assembly from the main bracket; (2) inserting the new intermediate shaft 648 through the main bracket; (3) securing the inner intermediate pulley wheel 612B onto the tapered distal end of the intermediate shaft and seating the wheel 612B by lightly tapping with a dead blow hammer; (4) screwing the wheel 612B in place along with liquid thread locker; and (5) applying about 30 ft·lbs of torque to the compression bolt 650B.

In some examples, but not all examples, at Step 1108, the process further includes installing the cap cover 1056 onto the drive-belt cover (not shown) of the supercharger system and securing the new cap cover 1056 with screws 1066.

Finally, at Step 1110, the process further involves completing the standard installation of the modified supercharger system onto the motorcycle, including, e.g., by installing and tensioning a drive belt 108 between the flywheel drive pulley 310 and the outer intermediate pulley wheel 612A, and securing the drive-belt cover overtop of the drive belt 108.

It should be understood that individual steps of the previous examples may be performed in any suitable order and/or simultaneously, as long as the overall technique remains operable. Similarly, various aspects disclosed herein may be combined in different combinations than those explicitly presented in the description and accompanying drawings. Additionally, certain aspects of this disclosure described as being performed by a single module or unit (e.g., for clarity) may also be performed by a combination of units or modules associated with a supercharger system 100.

What is claimed is:

1. A motorcycle-supercharger enhancement kit comprising:
- a driveshaft assembly defining a central longitudinal axis, the driveshaft assembly comprising:
  - a driveshaft defining a tapered distal portion;
  - an aluminum or carbon-fiber flywheel drive pulley defining a tapered central bore configured to receive the tapered distal portion of the driveshaft to form a locking-taper interface between the driveshaft and the flywheel drive pulley;
- a 25×52×15 open roller bearing;
- two Grade-5, 3/8-16×3/4 hex bolts;
- two 3/8-inner-diameter flat-thrust washers;
- a 3/8-16×3/4 flathead cap screw;
- a 3/8-inner-diameter beveled washer;
- a sealed, 17×40×12 outer roller bearing;
- a sealed, 25×47×12 inner roller bearing;
- a pulley-wheel cover cap;
- four #8-32×1/2 flathead cap screws; and
- a tube of liquid thread-locker adhesive.

2. The kit of claim 1, wherein the locking-taper interface defines a taper angle of between about 1° and about 12° relative to the central longitudinal axis of the driveshaft assembly.

3. The kit of claim 2, wherein the taper angle is between about 5° and about 7°, inclusive.

4. The kit of claim 1, wherein the flywheel drive pulley defines an outer diameter of between about 2.675 inches and about 8.025 inches, inclusive.

5. The kit of claim 4, wherein the outer diameter of the flywheel drive pulley is between about 4.815 inches and about 5.885 inches, inclusive.

6. The kit of claim 1, wherein the driveshaft defines a longitudinal length of between about 2.85 inches and about 8.55 inches, inclusive, as measured parallel to the central longitudinal axis of the driveshaft assembly.

7. The kit of claim 6, wherein the longitudinal length of the driveshaft is between about 5.13 inches and about 6.27 inches, inclusive.

8. The kit of claim 1, further comprising an intermediate-shaft assembly, wherein the intermediate-shaft assembly comprises:

an intermediate shaft;

an outer intermediate pulley; and an inner intermediate pulley.

* * * * *